United States Patent
Qiu et al.

(10) Patent No.: US 12,238,787 B2
(45) Date of Patent: *Feb. 25, 2025

(54) ARCHITECTURE FOR RANDOM ACCESS MESSAGING

(71) Applicant: ZTE Corporation, Guangdong (CN)

(72) Inventors: Zhihong Qiu, Shenzhen (CN); He Huang, Shenzhen (CN); Eswar Kalyan Vutukuri, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/521,773

(22) Filed: Nov. 28, 2023

(65) Prior Publication Data

US 2024/0098804 A1    Mar. 21, 2024

Related U.S. Application Data

(63) Continuation of application No. 17/583,569, filed on Jan. 25, 2022, now Pat. No. 11,871,458, which is a continuation of application No. PCT/CN2019/098448, filed on Jul. 30, 2019.

(51) Int. Cl.
*H04W 74/0833* (2024.01)
*H04L 1/00* (2006.01)

(52) U.S. Cl.
CPC ......... *H04W 74/085* (2013.01); *H04L 1/0008* (2013.01)

(58) Field of Classification Search
CPC ........... H04W 74/085; H04W 74/0833; H04W 74/0841; H04W 72/1268; H04W 74/004; H04W 74/006; H04L 1/0008; H04L 69/161

See application file for complete search history.

(56) References Cited

U.S. PATENT DOCUMENTS

| | | |
|---|---|---|
| 2009/0163211 A1 | 6/2009 | Kitazoe et al. |
| 2009/0201798 A1 | 8/2009 | Lee et al. |
| 2014/0126527 A1 | 5/2014 | Xiong et al. |
| 2018/0279375 A1 | 9/2018 | Jeon et al. |
| 2019/0215706 A1 | 7/2019 | Tsai |
| 2019/0335515 A1 | 10/2019 | Chen et al. |
| 2020/0037394 A1 | 1/2020 | Ohama et al. |

(Continued)

FOREIGN PATENT DOCUMENTS

| | | |
|---|---|---|
| CN | 101904213 A | 12/2010 |
| CN | 108811166 A | 11/2018 |

(Continued)

OTHER PUBLICATIONS

International Search Report for priority application No. PCT/CN2019/098448 dated Apr. 30, 2020, 2p.

(Continued)

*Primary Examiner* — Ivan O Latorre
(74) *Attorney, Agent, or Firm* — Crowell & Moring LLP

(57) ABSTRACT

User equipment may request to communicate with a basestation over a contention-based wireless communication channel. The basestation and the user equipment may perform a multiple-step random access protocol to determine whether the user equipment may communicate over the wireless communication channel. The architecture, e.g., the fields and structure of the messages sent by the basestation may indicate the content and type of those same messages.

23 Claims, 20 Drawing Sheets

(56) References Cited

U.S. PATENT DOCUMENTS

| | | |
|---|---|---|
| 2020/0052767 A1 | 2/2020 | Wang et al. |
| 2020/0077444 A1 | 3/2020 | Liu et al. |
| 2020/0077447 A1 | 3/2020 | Yang |
| 2020/0107370 A1 | 4/2020 | Wei et al. |
| 2020/0107372 A1 | 4/2020 | Agiwal et al. |
| 2020/0178308 A1 | 6/2020 | Chen |
| 2020/0329504 A1 | 10/2020 | Kunt et al. |
| 2021/0051726 A1 | 2/2021 | Xu et al. |
| 2021/0120581 A1 | 4/2021 | Kim |
| 2021/0195676 A1 | 6/2021 | Wang et al. |
| 2022/0053568 A1 | 2/2022 | Xing et al. |
| 2022/0141882 A1 | 5/2022 | Xu et al. |
| 2022/0183058 A1 | 6/2022 | Qiu et al. |
| 2022/0183059 A1 | 6/2022 | Lee et al. |
| 2022/0232623 A1 | 7/2022 | Lee et al. |

FOREIGN PATENT DOCUMENTS

| | | |
|---|---|---|
| CN | 109661803 A | 4/2019 |
| EP | 3 941 147 A1 | 3/2020 |
| WO | WO 2018/226026 A1 | 12/2018 |
| WO | WO 2019/064088 A1 | 4/2019 |
| WO | WO 2019/139526 A1 | 7/2019 |
| WO | WO 2020/184954 A1 | 9/2020 |
| WO | WO 2020/200260 A1 | 10/2020 |

OTHER PUBLICATIONS

Written Opinion of the International Searching Authority for priority application No. PCT/CN2019/098448 dated Apr. 30, 2020, 5p.
Extended European Search Report for corresponding European patent No. 19939629.2 dated Mar. 27, 2023, 10p.
First Office Action for corresponding Chinese application No. 202210304184.5 dated Aug. 18, 2023, 11p, in Chinese language.
English language translation of First Office Action for corresponding Chinese application No. 202210304184.5 dated Aug. 18, 2023, 4p.
Zte et al., "MsgB content and format", 3GPP TSG-WG2 Meeting #106, R2-1906306, May 17, 2019, 13p.
Nokia et al., "MsgB design," 3GPP TSG-RAN WG2 #105bis R2-1903716, Apr. 8-12, 2019, 3p, China.
Samsung, "Random Access in NR: RAR MAC PDU Design", 3GPP TSG-RAN WG2 Meeting #99, R2-1707683, Aug. 25, 2017, 4p, DE.
ETRI, "Contention resolution and SRB/DRB delivery for 2-step RACH", 3GPP TSG-RAN WG2 Meeting #106, R2-1906746, May 17, 2019, 2p, US.
Second Office Action for corresponding Chinese application No. 2022103041845 dated Dec. 20, 2023, 6p, in Chinese language.
English language translation for Second Office Action for corresponding Chinese application No. 2022103041845 dated Dec. 20, 2023, 3p.
Communication pursuant to Article 94(3) EPC dated Oct. 31, 2024 for European Patent Application No. 19 939 629.2-1215; 7 pages.

ARCHITECTURE FOR RANDOM ACCESS MESSAGING

RELATED APPLICATION

This application is a continuation application of U.S. application Ser. No. 17/583,569, filed Jan. 25, 2022, which is a continuation application of International Patent Application No. PCT/CN2019/098448, filed Jul. 30, 2019 and entitled "ARCHITECTURE FOR RANDOM ACCESS MESSAGING," both of which are incorporated by reference in their entireties.

TECHNICAL FIELD

This disclosure relates to an architecture for random access messaging.

BACKGROUND

Wireless communication technologies are moving the world towards a rapidly increasing network connectivity. High-speed and low-latency wireless communications rely on efficient network resource management and allocation between user mobile stations and wireless access network nodes (including but not limited to wireless base stations). Unlike traditional circuit-switched networks, efficient wireless access networks may not rely on dedicated user channels. Instead, wireless network resources (such as carrier frequencies and transmission time slots) for transmitting voice or other types of data from mobile stations to wireless access network nodes may be allocated on a contention-based random access basis rather than a grant-based fixed access basis.

DETAILED DESCRIPTION

In various telecommunications systems a contention-based random access channel may be used. In contention-based systems multiple-possible transmitters, e.g., in a mobile telecommunications context, user equipment (UE), may send a request message to a base station, which may be a nodeB (NB, e.g., an eNB or gNB) in a mobile telecommunications context. The base station may respond to the UE request messages by providing a grant to transmit for one of the requestors and an indication of a network congestion (e.g., a backoff indicator) for other ones on the requestors. In some cases, where the requests themselves are transmitted on the random access channel, the UEs may have a backoff/retransmit system for handling incidental and interfering simultaneous requests to transmit.

Figure 1:
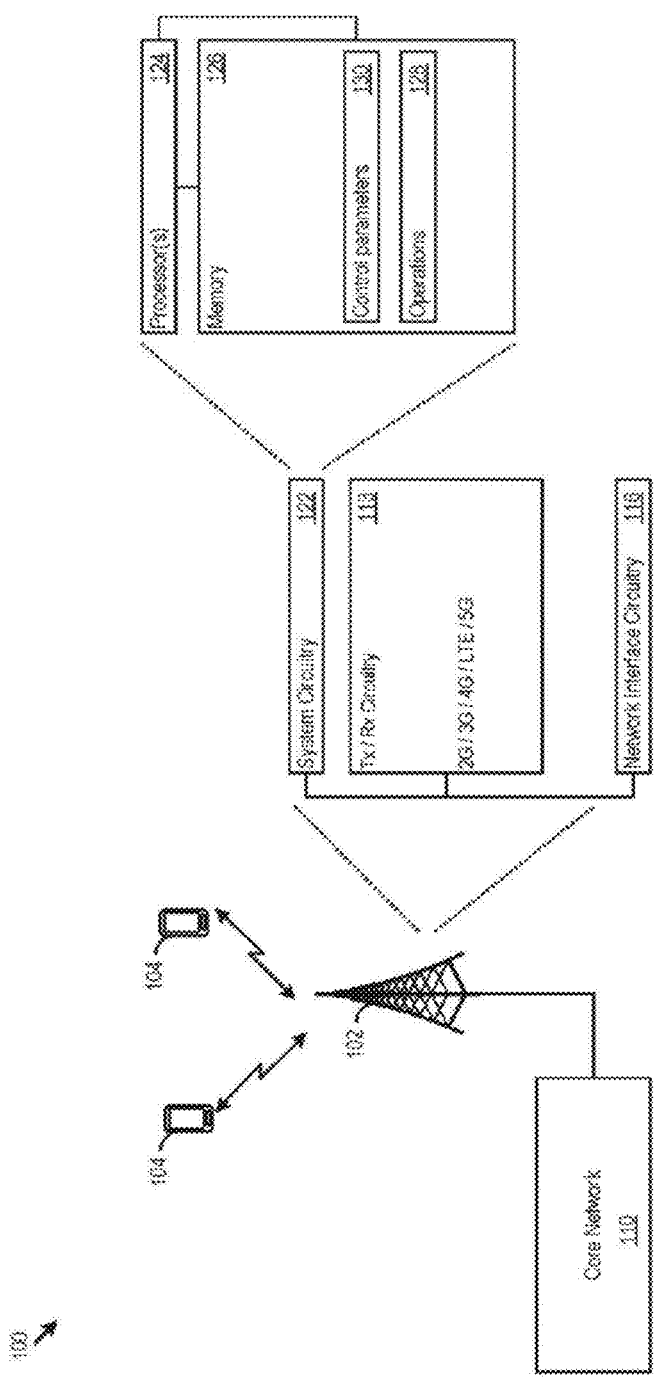
FIG. 1 shows an example base station.

FIG. 1 shows an example base station 102. The example base station may include radio Tx/Rx circuitry 113 to receive and transmit with UEs 104. The base station may also include network interface circuitry 116 to couple the base station to the core network 110, e.g., optical or wireline interconnects, Ethernet, and/or other data transmission mediums/protocols.

The base station may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the base station. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

Figure 2:
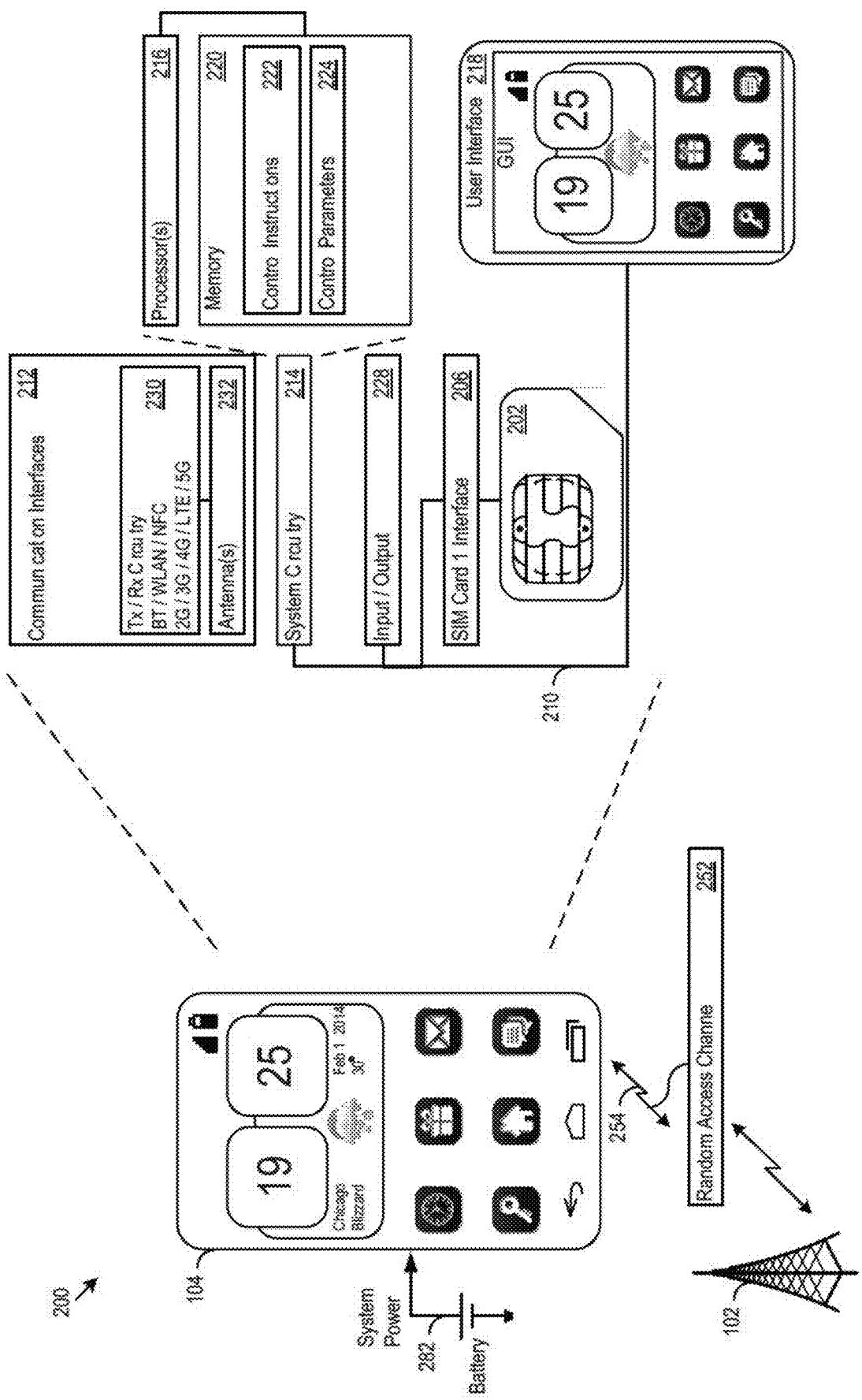
FIG. 2 shows an example random access messaging environment

FIG. 2 shows an example random access messaging environment 200. In the random access messaging environment a UE 104 may communicate with a base station 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212.

In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Figure 3:
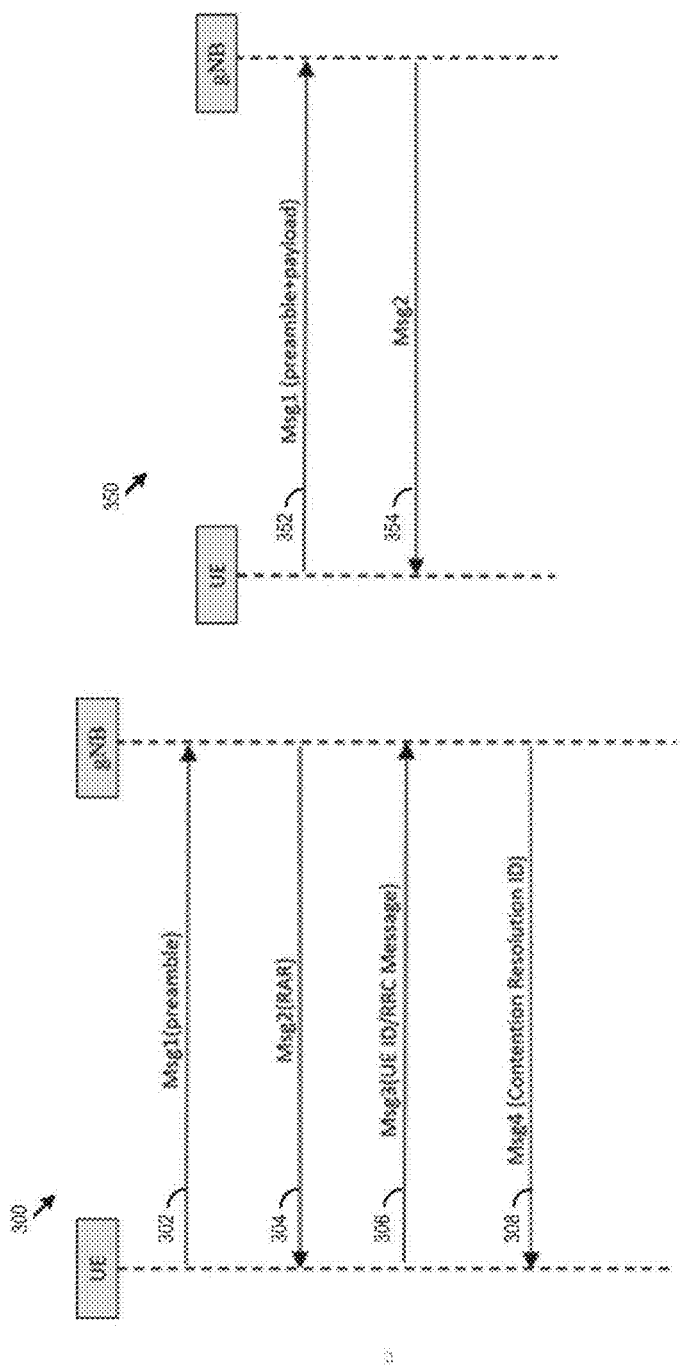
FIG. 3 shows example multiple step random access protocols.

Referring now to FIG. 3, FIG. 3 shows example multiple step random access protocols 300, 350. In various implementations, a UE and base station may engage in a multiple step protocol to: (i) UE send a preamble (e.g., in Msg1) to the base station (302), (ii) after reception of preamble, BS sends back a random access response (RAR)s (e.g., Msg2) to UE (304), (iii) UE sends back a third message (e.g., Msg3) on the UL grant indicated in the RAR containing the preamble transmitted in Msg1 (306), and (iv) After successfully decoding Msg3, a fourth message (e.g., Msg4) is transmitted from the base station to the UE for performing contention resolution (308). This example four-step random access channel protocol 300 may allow for establishment of RRC connections.

In some implementations, the latency created through the four-step random access protocol 300 (e.g., 4-step RACH) may be decreased by using a two-step random access protocol 350 (e.g., 2-step RACH). The 2-step RACH 350 may combine (i) and (iii) and combine (ii) and (iv) to condense the RACH protocol into two steps: (a) send a first message, e.g. Msg1. In some examples the first message contains a preamble transmitted in physical random access channel and/or payload transmitted in physical uplink shared channel, which contains at least the same amount of information that is carried in Msg3 of 4-step RACH (b) A second message, e.g. Msg2 in respond to Msg1 is transmitted from BS to UE. Thus, the combination of the two UE messages allows for the combination of the two base station messages. The example 2-step RACH may allow for reduced latency compared to the 4-step RACH, which may reduce channel occupancy times increase data available for payload transmission or have other technical benefits. Accordingly, implementing a 2-step RACH is a technical solution to a technical problem of increasing data network performance thereby improving the operation of the underlying hardware.

In various systems to implement a RACH protocol, and in some cases specifically a 2-step RACH, the architecture (e.g., the header/body structure of the messages and the fields therein) of the random access messages may vary. Although in the examples discussed in this disclosure the architectures and techniques are used in the context of a reply message (e.g., Msg2) of a 2-step RACH, the architectures and techniques discussed herein may be applied to other random access messages where message architecture and content may be used to distinguish among message types. within the may be selected to support the identification of multiple different Msg2 content when received by the UE. For example, the base station may use various message architectures to distinguish among random access messages including (e.g., in the mobile communications context) backoff indicators, success random access responses (RARs), fallback RARs, signal radio bearer (SRB) messages, arbitration messages or other random access messages. Distinguishing among messages at least in part via architecture (e.g., rather than exclusive use of message payload), may allow for faster identification, decoding, processing, and handling of random access messages. Accordingly, the use of fields and/or message structure to distinguish a technical solution to a technical problem of increasing data network performance thereby improving the operation of the underlying hardware.

Figure 4:
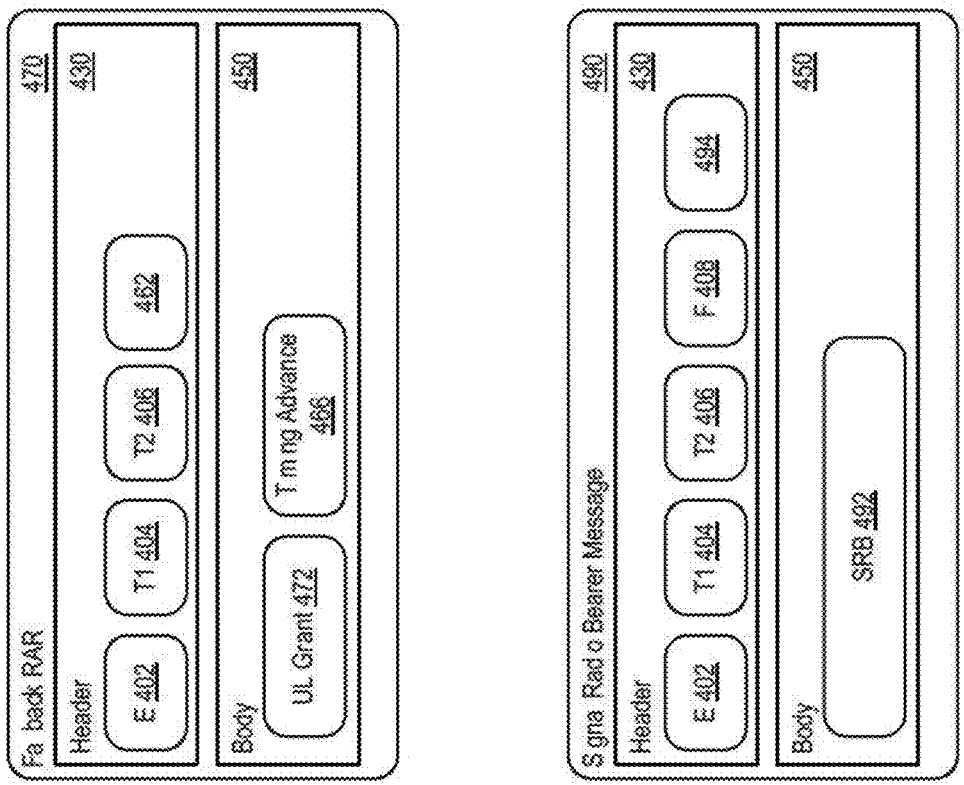
FIG. 4 shows example random access messages.
Figure 4:
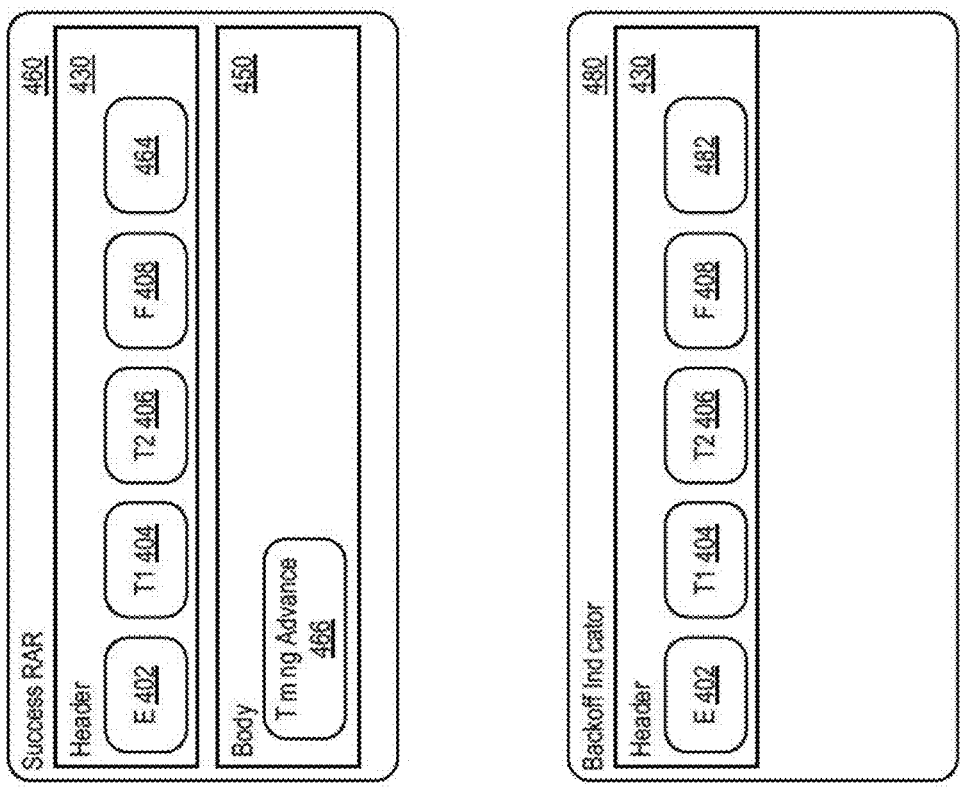

FIG. 4 shows example random access messages 460, 470, 480, 490. The random access message in this patent refer to MAC subPDU, which will be transmitted from NW to UE as response of the reception of first message of RACH procedure. The example random access messages, including an example success RAR message 460, an example fallback RAR message 470, an example backoff indicator 480, and an example signal radio bearer message 490, may include various combinations of headers 430 and/or message bodies 450. The random access messages 460, 470, 480, 490 may include example extension fields E 402, example Type 1 fields (T1) 404 example type 2 fields (T2) 406, and example format flags (F) 408. The example message includes preamble index 462, timing advance command fields 466, uplink grants 472, UE contention resolution identifiers 464, backoff indicators 482, signal radio bearer (SRB) fields 492 and signal radio bearer parameters 494 (which may include any or all of: parameters to indicate the length of the SRB Service Data Unit (SDU), the SRB type, the logical channel (LCH) that carries the SRB SDU) and/or combinations thereof. Other fields may be present. The combination (including their presence and/or absence) of the example type 1 fields (T1) 404 example type 2 fields (T2) 406, and example format flags (F) 408 may indicate which of the preamble indices 462, UL grants fields 472, contention messages 464, backoff indicators 482, signal radio bearer messages/parameters 492 and/or combinations thereof may be included within the messages. Different architectures using various combinations of the example type 1 fields (T1) 404 example type 2 fields (T2) 406, and example format flags (F) 408 may distinguish among the content options. Further, various ones of the type 1 fields (T1) 404 example type 2 fields (T2) 406, and example format flags (F) 408 may be included in the headers 430 or moved to the message bodies 450 in various example architectures. Further, different architectures using various combination of parameters included in signal radio bearer parameters 494 may be included in the headers 430 or moved to the message bodies 450. Further, contention messages 464 can be moved to the message bodies 450.

In the various examples, by implementing the various ones of the type 1 fields (T1) 404, example type 2 fields (T2) 406, and example format flags (F) 408 in accord with defined rules, the base station may ensure that UE is able to identify the content and type of the random access message to allow for efficient decoding and handling.

In the examples messages the particular configurations of Type 1 fields (T1) 404 example type 2 fields (T2) 406, and example format flags (F) 408 are examples. Other configurations may be used. While other configurations are possible, including some implementations represented in the six Example Implementations discussed below, the examples 460, 470, 480, 490 illustrate, that message architecture rules (e.g., the message structure, field presence/absence, and/or field content) may be linked to message type and content for identification of messages.

In the examples, the T1 field may indicate the absence or presence of the T2 field. The T2 field may distinguish among various random access message types with its content. The T2 field distinguish among an additional access message type with its absence or presence. The F flag may further distinguish among types. In some cases, the T2 field may be expanded to distinguish among options identified by T1 or F field content (e.g., and the T1 and/or F fields may be omitted or included for redundancy). In some cases, the treatment of the content of the T2 field (or "T" field when the only one "type" field is used in a particular protocol) may be conditional. In an example context using backoff indicators, the T field may be replaced by a backoff validity status indicator that indicates whether a backoff indicator in the same random access message should be ignored. However, the treatment T field may be non-conditional in various other implementations using backoff indicators. In the examples, the E field may be included to designate whether a particular random access message is a final message in a data unit (e.g., a LTE and/or 5G protocol data unit) or if additional messages are included after the random access message.

In some implementations, when the type 1 field indicates the type 2 field is not present, the random access message may be a fallback RAR. Accordingly, the type 2 field may distinguish among messages including backoff indicators, success RARs (which may include a preamble index), and signal radio bearer messages. In some cases, the type 1 and type 2 fields may be included in the message header portion of the random access message. In some cases, backoff indictor type random access messages may not necessarily include a message body portion.

In various other implementations, the type 1 field indicating that the type 2 field is not present, may indicate that the random access message is backoff indicator, success RAR, or signal radio bearer message. Accordingly, the type 2 field may distinguish among the other three types.

In various implementations, a success RAR message may be combined with a signal radio bearer message. In some cases, the body of success RAR messages may including F flags to indicate whether the success RAR message includes a signal radio bearer message. In some cases, the F flag may be included in the header. In some cases, the base station may broadcast or dedicated signal an indicator to UEs indicating whether or not success RAR messages may include signal radio bearer messages. In some cases, when combined success RAR message/signal radio bearer messages are used, the T field may distinguish among fewer options due to the combination of message types. In some cases, the F flag may be omitted and its function may be performed by the T field.

Figure 5:
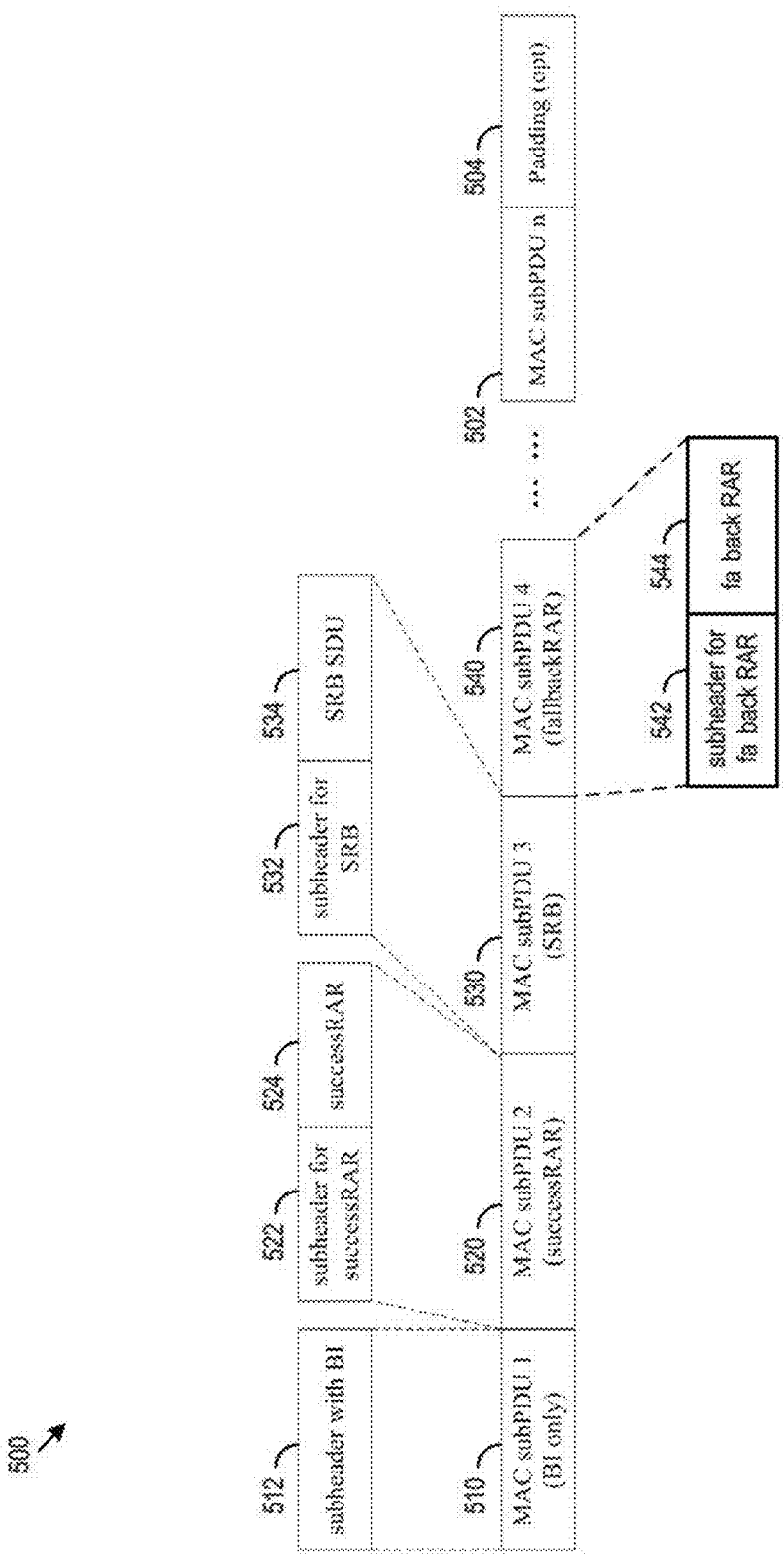
FIG. 5 shows illustrative examples of random access messages in an example media access control protocol data unit.

FIG. 5 shows an illustrative example of random access messages in an example media access control (MAC) PDU 500 in a LTE/5G context, where the random access message refer to MAC subPDU. The media access control (MAC) PDU may include multiple random access messages for different UEs. The example MAC PDU 500 includes an example backoff indicator 510 in a first sub-PDU with a subheader 512, an example success RAR 520 in a second sub-PDU with a subheader 522 and body 524, an example signal radio bearer (SRB) 530 in a third sub-PDU with a subheader 532 and body 534, and an example fallback RAR 540 in a fourth sub-PDU with a subheader 542 and body 544. The MAC PDU 500 includes other sub-PDUs 502 and optional padding 504. The example is illustrative of content options for MAC PDUs. However, the content of MAC PDUs and the location of MAC subPDUs in the MAC PDUs may change situationally responsive to UE requests. For example, some or all of the backoff indicator 510, success RAR 520, SRB 530, and fallback RAR 540 may be omitted from any given MAC PDU sent by a base station if no requests relevant to a particular message type are made by UEs.

The methods, devices, processing, circuitry, and logic described above and below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

EXAMPLE IMPLEMENTATIONS

The example implementations (discussed below are included for the purposes of example illustration of the techniques and architectures discussed. The principles illustrated in the example implementations may be applied separately, combined, or in different contexts from those of the example implementation. For example, various ones of the implementations discussed below are discussed in the context of 5G mobile communication standards. However, the principles may be applied to other mobile communication standards.

Example Implementation 1

Format for a MAC subheader of Msg2 sent in response to a Msg1 in a two-step RACH:

TABLE 1

| MAC Subheader Field Options |
| --- |
| E: The Extension field is a flag indicating if the MAC subPDU including this MAC subheader is the last MAC subPDU or not in the MAC PDU; The size of the E field is 1 bit. For example, if the E field is set to "1" to indicate at least another MAC subPDU follows, while is set to "0" to indicate that the MAC subPDU including this MAC subheader is the last MAC subPDU in the MAC PDU.<br>T1: The Type 1 field is a flag indicating whether the MAC subheader contains a Random Access Preamble ID (RAPID, e.g., a preamble index), or a Type 2 field. The size of the T1 field is 1 bit. For example, the T1 field is set to "1" to indicate the presence of a RAPID, while set to "0" to indicate the presence of a T field, or vice versa.<br>T2: The Type 2 field is a flag to indicate the content of MAC subheader and the content of MAC subPDU after the MAC subheader. The size of T2 is 2 bits. The definition of Type 2 field can be given as follows:<br>    "00": Backoff Indicator is present in the MAC subheader, and the MAC subPDU include MAC subheader only.<br>    "01": RAPID field (Or in another alternative Contention Resolution ID) is present in the MAC subheader, and a success RAR is included in the MAC subPDU.<br>    "10": LCH ID indication and L field are present in the MAC subheader, and a SRB SDU is included in the MAC subPDU after the MAC subheader. In this alternative, if SRB SDU is presented (e.g. the SRB SDU will be encapsulated as a separate MAC subPDU), the corresponding MAC subPDU with SRB SDU shall be located after the corresponding success RAR for the same UE.<br>    "11": Reserved.<br>L: The length of SRB SDU. The size of the L field is 8 bits<br>    LCH Ind (Logical Channel Indicator): The LCH indicator is to indicate the logical channel ID of the SRB SDU. The size of LCH indicator can be of one or two bits.<br>    If the size of LCH indicator is of two bits, then:<br>        "0": The logical channel ID is 0.<br>        "1": The logical channel ID is 1.<br>    If the size of LCH indicator is of two bits, then:<br>        "00": The logical channel ID is 0.<br>        "01": The logical channel ID is 1.<br>        "10": The logical channel ID is 2.<br>        "11": The logical channel ID is 3.<br>Other alternatives for the LCH indicator that the LCH indicator can be used to indicate the SRB ID of the SRB SDU.<br>    If the size of LCH indicator is of 1 bits, then:<br>        "0": The SRB SDU is for SRB0<br>        "1": The SRB SDU is for SRB1.<br>    If the size of LCH indicator is of two bits, then:<br>        "00": The SRB SDU is for SRB0.<br>        "01": The SRB SDU is for SRB1.<br>        "10": The SRB SDU is for SRB2.<br>        "11": The SRB SDU is for SRB3. |

TABLE 1-continued

MAC Subheader Field Options

BI: The Backoff Indicator (BI) field identifies the overload condition in the cell. The size of the BI field is 4 bits.
RAPID: The RAPID filed identifies the transmitted Random Access preamble. The size of the RAPID filed is 6 bits.
R: Reserved bit, set to "0".

The bit values (and respective logical meanings) shown in table are examples. However, logical meanings may be assigned to other bit values.

TABLE 2

MAC Subheader Type Options

Backoff Indicator only, which includes four header fields: E/T1/T2/BI
Subheader for Fallback RAR, which includes three header fields: E/T1/RAPID
Subheader for Success RAR with RAPID in the header part, which includes ten header fields: E/T1/T2/R/R/R/R/R/RAPID.
Alternative subheader for Success RAR with UE Contention Resolution ID in the header part, which includes E/T1/T2/R/R/R/UE CRID, for cases using CRID in place of RAPID.
SRB, which includes eight header fields: E/T1/T2/LCH Ind/R/R/R/L.
Alternative SRB, which includes seven header fields: E/T1/T2/LCH Ind/R/R/L. In this alternative LCH Ind has a size of two bits.

Figure 6:
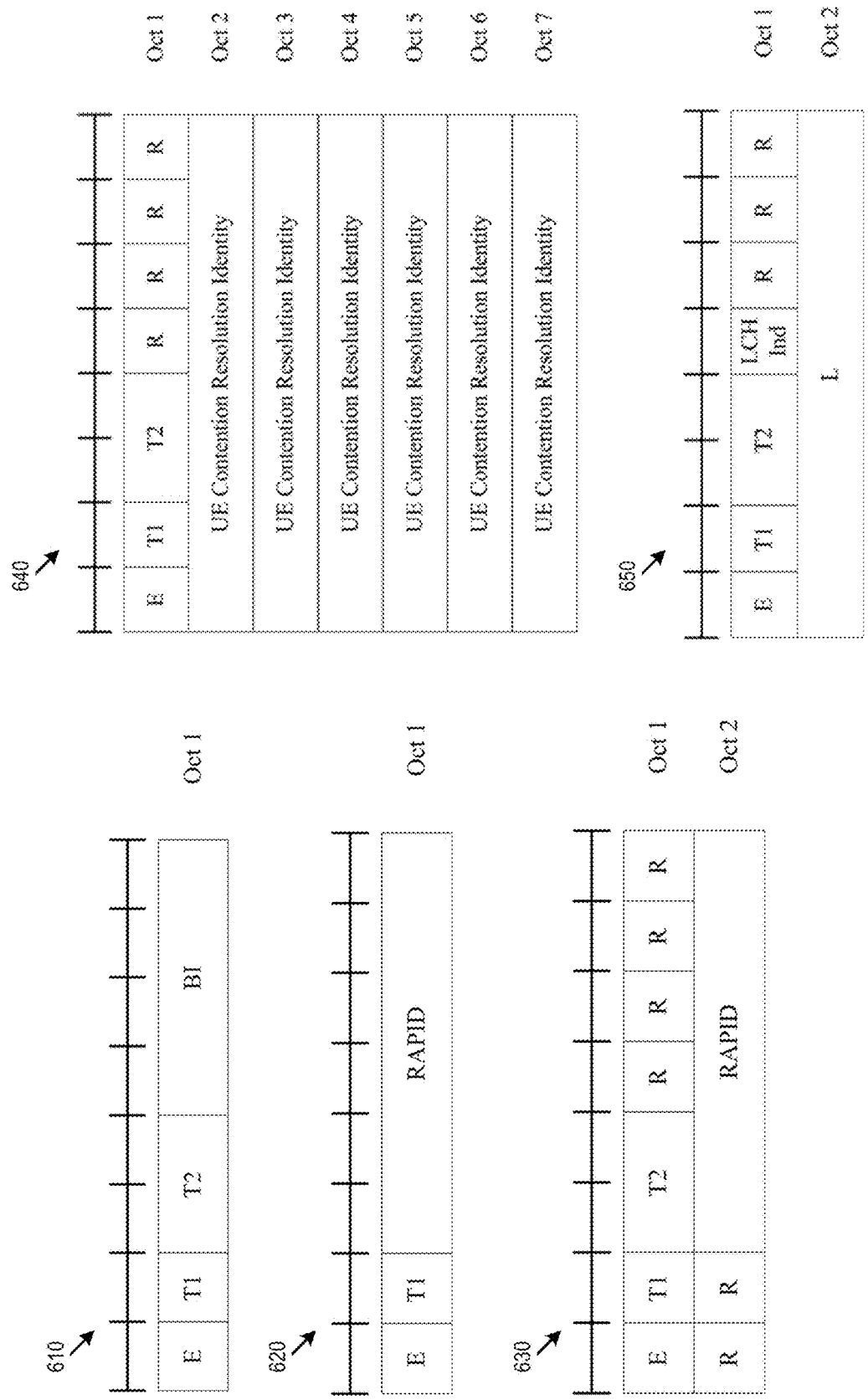
FIG. 6 shows example random access message subheaders.

FIG. 6 shows an example one octet (e.g., 8-bits) BI subheader 610, an example one octet fallback RAR subheader 620, an example two-octet success RAR subheader 630 using a RAPID, an example multi-octet success RAR subheader 640 using UE CRID, and an example two-octet SRB subheader 650.

Format for a MAC payload of Msg2 sent in response to a Msg1 in a two-step RACH:

TABLE 3

Success RAR Body Format Field Options (when RAPID is used in the subheader)

Contention Resolution ID: This field contains the UL CCCH SDU. If the UL CCCH SDU is longer than 48 bits, this field contains the first 48 bits of the UL CCCH SDU. The size of the Contention Resolution ID is 48 bits.
Timing Advance Command: The same as the TAC field used in various four-step RACH implementations. The size of the Timing Advance Command field is 12 bits.
C-RNTI (Cell Radio Network Temporary Identifier): The C-RNTI allocated for the UE within the cell. The size of the C-RNTI field is 16 bits.
R: Reserved bit, set to "0";

TABLE 4

Success RAR Body Format Field Options (when UE CRID is used in the subheader)

Figure 7:
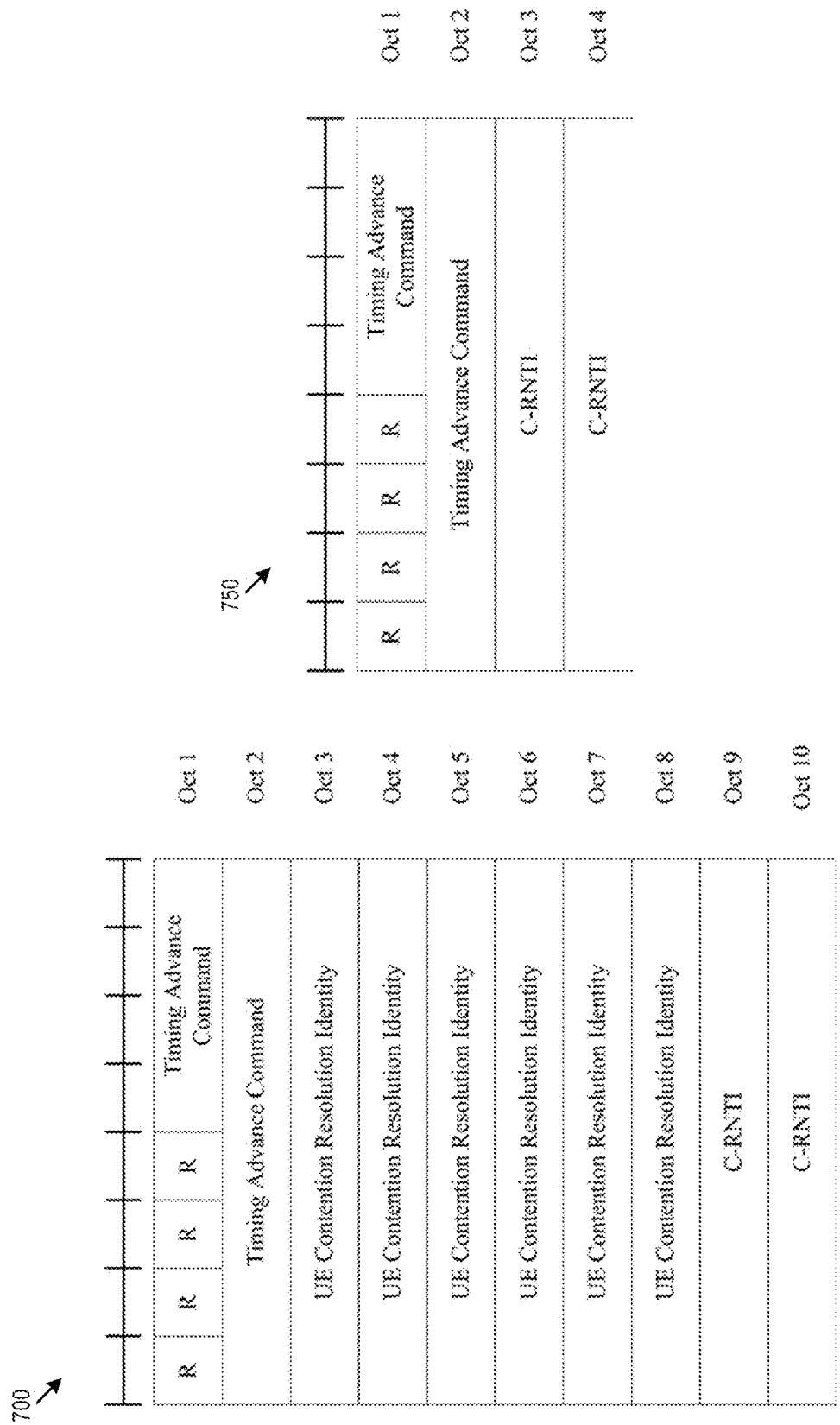
FIG. 7 shows example random access message bodies.

Timing Advance Command: The size of the Timing Advance Command field is 12 bits.
C-RNTI: The C-RNTI allocated for the UE within the cell. The size of the C-RNTI field is 16 bits.
R: Reserved bit, set to "0";

FIG. 7 shows an example multiple-octet success RAR body when RAPID is included in the subheader 700 and an example multiple-octet success RAR body when UE CRID is included in the subheader 750.

The SRB message body may include a SRB field with a length in accord with that indicated in the length field of the SRB message header.

TABLE 5

Fallback RAR Body Format Field Options

Figure 8:
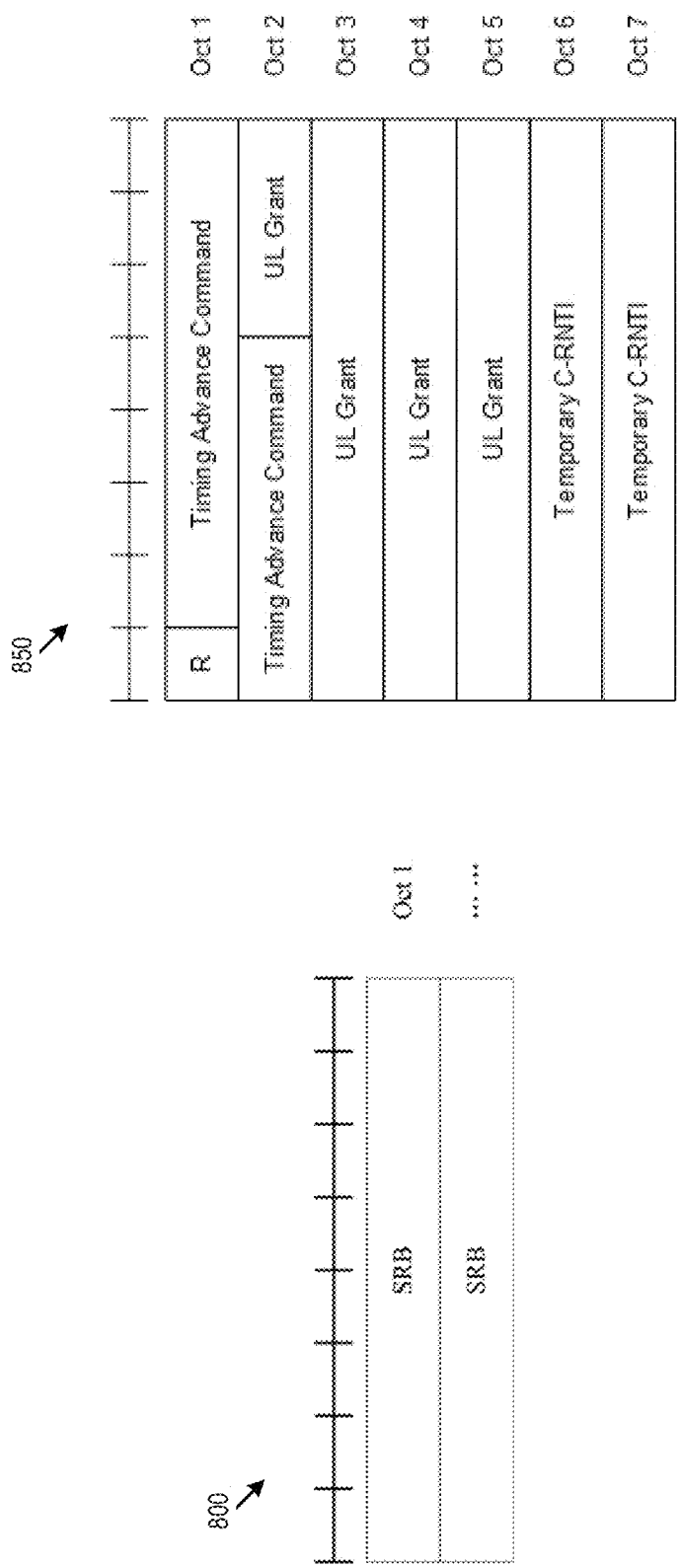
FIG. 8 shows example random access message bodies.

Timing Advance Command: The size of the Timing Advance Command field is 12 bits.
UL (Uplink) Grant: The same as the UL Grant field used in various four-step RACH implementations. The size of the UL Grant field is 27 bits;
Temporary C-RNTI: The Temporary C-RNTI field indicates the temporary identity that is used by the MAC entity during Random Access. The size of the Temporary C-RNTI field is 16 bits.
R: Reserved bit, set to "0";

FIG. 8 shows an example multiple-octet SRB message body 800 and an example multiple-octet fallback RAR body 850.

In some cases of example implementation 1, the Msg2 MAC PDU consists of one or more MAC subPDUs and optionally padding. Each MAC subPDU consists one of the following:
- a MAC subheader with Backoff Indicator only;
- a MAC subheader and success RAR, and the MAC subheader identifying success RAR contains RAPID;
- a MAC subheader and fallbackRAR.
- a MAC subheader and SRB SDU.

Or in another cases of example implementation 1, the Msg2 MAC PDU consists of one or more MAC subPDUs and optionally padding. Each MAC subPDU consists one of the following:
- a MAC subheader with Backoff Indicator only;
- a MAC subheader and success RAR, and the MAC subheader identifying success RAR contains UE CRID;
- a MAC subheader and fallbackRAR.
- a MAC subheader and SRB SDU.

For the examples given in example implementation 1, if an SRB SDU with subheader is presented (e.g., the SRB SDU will be encapsulated as a separate MAC subPDU), the corresponding MAC subPDU with SRB SDU shall be located after the corresponding success RAR for the same UE.

Example Implementation 2

Format for a MAC subheader sent in response to a UE message in a two-step RACH:

TABLE 6

MAC Subheader Field Options

E: The Extension field is a flag indicating if the MAC subPDU including this MAC subheader is the last MAC subPDU or not in the MAC PDU; The size of the E field is 1 bit. For example, if the E field is set to "1" to indicate at least another MAC subPDU follows, while is set to "0" to indicate that the MAC subPDU including this MAC subheader is the last MAC subPDU in the MAC PDU.
T1: The Type 1 field is a flag indicating whether the MAC subheader contains a Random Access Preamble ID (RAPID, e.g., a preamble index), or a Type 2 field. The size of the T1 field is 1 bit. For example, the T1 field is set to "1" to indicate the presence of a RAPID, while set to "0" to indicate the presence of a T field, or vice verse.
T2: The Type 2 field is a flag to indicate the content of MAC subheader and the content of MAC subPDU after the MAC subheader. The size of T is 2 bits. The definition of Type 2 field can be given as follows:
   "00": Backoff Indicator is present in the MAC subheader, and the MAC subPDU include MAC subheader only.
   "01": RAPID field (Or in another alternative Contention Resolution ID) is present in the MAC subheader, and a success RAR without SRB SDU is included in the MAC subPDU.
   "10": RAPID field (Or in another alternative Contention Resolution ID), LCH ID indication and L field are present in the MAC subheader, and a success RAR with SRB SDU is included in the MAC subPDU after the MAC subheader.
   "11": Reserved.
L: The length of SRB SDU. The size of the L field is 8 bits
   LCH Ind (Logical Channel Indicator): The LCH indicator is to indicate the logical channel ID of the SRB SDU. The size of LCH indicator can be of one or two bits.
     If the size of LCH indicator is of two bits, then:
      "0": The logical channel ID is 0.
      "1": The logical channel ID is 1.
     If the size of LCH indicator is of two bits, then:
      "00": The logical channel ID is 0.
      "01": The logical channel ID is 1.
      "10": The logical channel ID is 2.
      "11": The logical channel ID is 3.
   Or in another alternative for the LCH indicator that the LCH indicator can be used to indicate the SRB ID of the SRB SDU.
   If the size of LCH indicator is of 1 bits, then:
     "0": The SRB SDU is for SRB0
     "1": The SRB SDU is for SRB1.
   If the size of LCH indicator is of two bits, then:

TABLE 6-continued

MAC Subheader Field Options

"00": The SRB SDU is for SRB0.
"01": The SRB SDU is for SRB1.
"10": The SRB SDU is for SRB2.
"11": The SRB SDU is for SRB3.
BI: The Backoff Indicator (BI) field identifies the overload condition in the cell. The size of the BI field is 4 bits.
RAPID: The RAPID filed identifies the transmitted Random Access preamble. The size of the RAPID filed is 6 bits.
R: Reserved bit, set to "0".

The bit values (and respective logical meanings) shown in table are examples. However, logical meanings may be assigned to other bit values.

TABLE 7

MAC Subheader Type Options

Backoff Indicator only, which includes four header fields: E/T1/T2/BI
Fallback RAR, which includes three header fields: E/T1/RAPID
Success RAR with RAPID and SRB, which includes ten header fields: E/T1/T2/LCH Ind/R/R/R/R/RAPID/L.
Success RAR with RAPID and without SRB, which includes ten header fields: E/T1/T2/R/R/R/R/R/RAPID.
Alternatively, the RAPID in Success RAR with and without SRB can be replaced by UE Contention Resolution ID. In this case, the subheader for Success RAR with SRB includes E/T1/T2/LCH Ind/R/R/UE CRID/L. And the subheader for Success RAR without SRB includes E/T1/T2/R/R/R/R/UE CRID.

Figure 9:
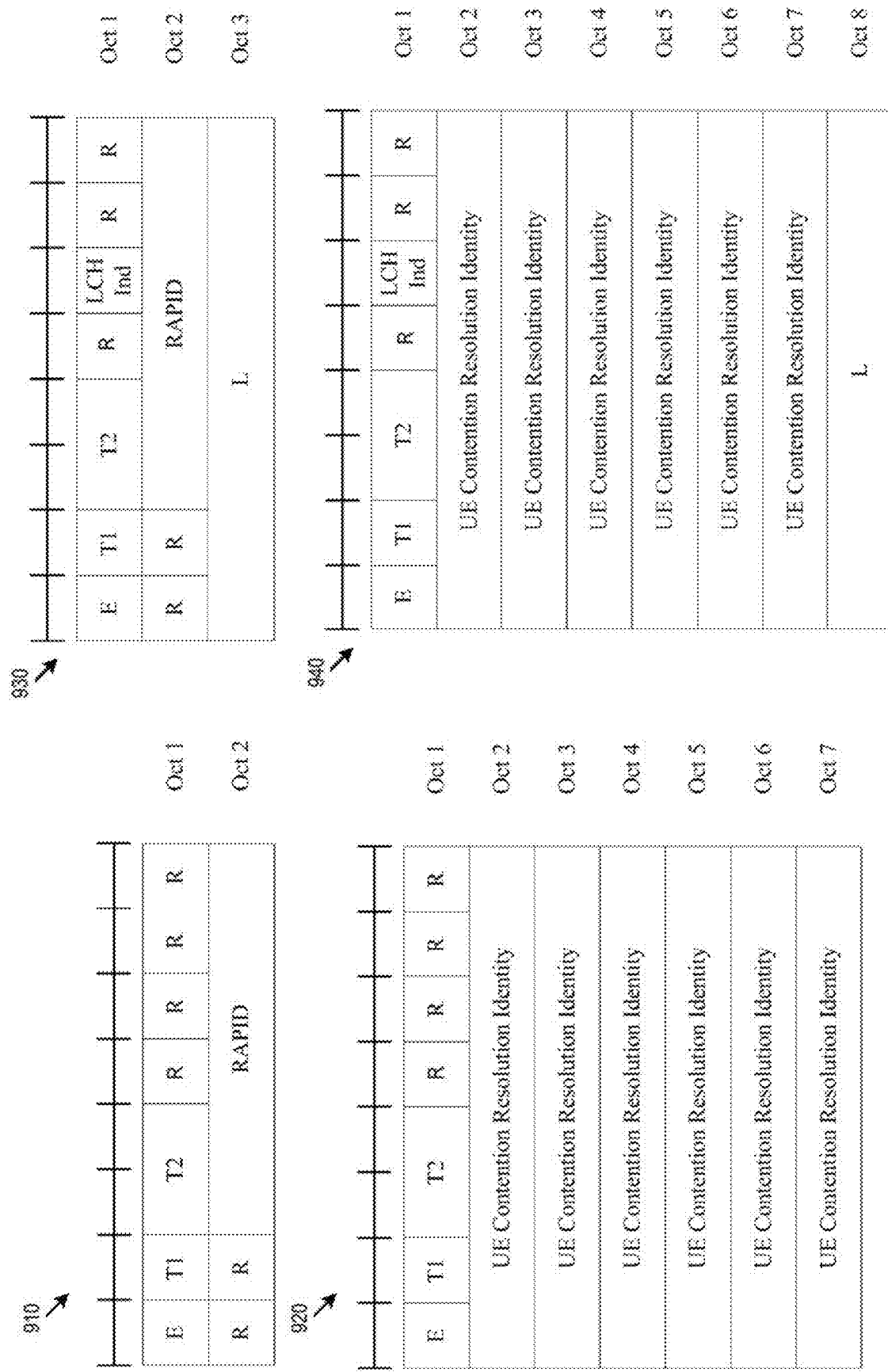
FIG. 9 shows example random access message subheaders.

FIG. 9 shows an example two-octet success RAR subheader 910 using a RAPID and without SRB, an example multi-octet success RAR subheader 920 using UE CRIDs and without SRB, an example two-octet success RAR subheader 930 using a RAPID and with SRB, an example multi-octet success RAR subheader 940 using UE CRIDs and with SRB.

TABLE 8

Success RAR Body Format Field Options with
SRB (when RAPID is used in the subheader)

Contention Resolution ID: The size of the Contention Resolution ID is 48 bits.
Timing Advance Command: The size of the Timing Advance Command field is 12 bits.
C-RNTI: The C-RNTI allocated for the UE within the cell. The size of the C-RNTI field is 16 bits.
SRB: The size of the SRB field is indicated in the L filed in the corresponding subheader.
R: Reserved bit, set to "0";

TABLE 9

Success RAR Body Format Field Options with
SRB (when UE CRID is used in the subheader)

Figure 10:
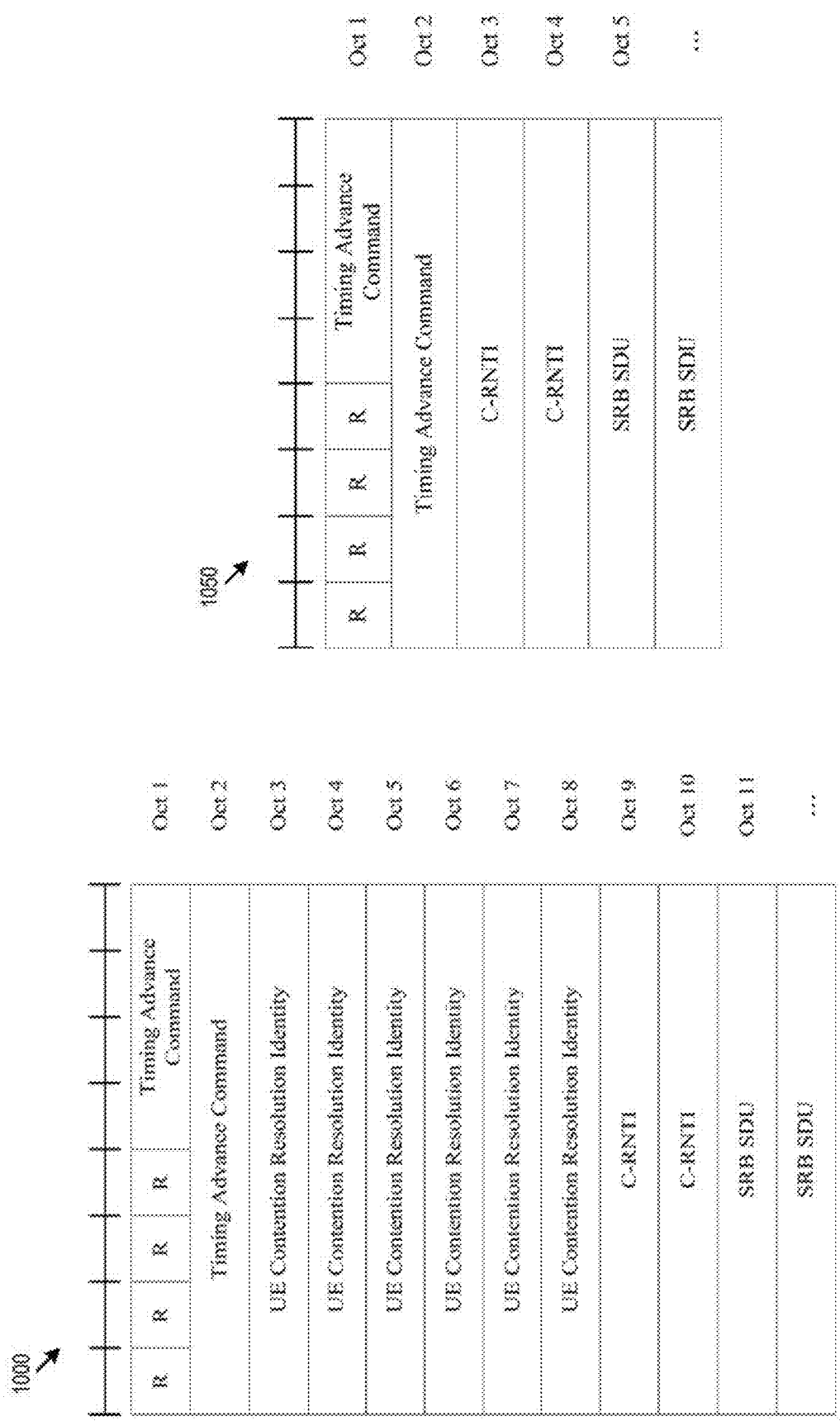
FIG. 10 shows example random access message bodies.

Timing Advance Command: The size of the Timing Advance Command field is 12 bits.
C-RNTI: The C-RNTI allocated for the UE within the cell. The size of the C-RNTI field is 16 bits.
SRB: The size of the SRB field is indicated in the L filed in the corresponding subheader.
R: Reserved bit, set to "0";

FIG. 10 shows an example multiple-octet success RAR body when RAPID is included in the subheader with SRB 1000 and a multiple-octet success RAR body when UE CRID is included in the subheader with SRB 1050. The subheader and body for the BI indictor, the subheader and body for the fallback RAR, the body for the success RAR using RAPID in subheader without SRB, and the body for the success RAR using UE CRID in subheader without SRB have the same formats as their analogs in Example Implementation 1.

In some cases of example implementation 2, the Msg2 MAC PDU consists of one or more MAC subPDUs and optional padding. The MAC subPDUs may include one of the following:
- a MAC subheader with Backoff Indicator only;
- a MAC subheader and fallbackRAR.
- a MAC subheader and success RAR with SRB.
- a MAC subheader and success RAR without SRB, In this example, the MAC subheader for the success RAR contains RAPID.

Or in another cases of example implementation 2, the Msg2 MAC PDU consists of one or more MAC subPDUs and optionally padding. Each MAC subPDU consists one of the following:
- a MAC subheader with Backoff Indicator only;
- a MAC subheader and fallbackRAR.
- a MAC subheader and success RAR with SRB.
- a MAC subheader and success RAR without SRB, In this example, the MAC subheader identifying success RAR contains UE Contention Resolution ID.

Example Implementation 3

In this example implementation, a combined success RAR/SRB message is used. In addition, a type field is included in the header and a second RAR type field is included in the message body for RAR messages (both fallback and success RARs). RAPID is used for success RARs to allow for consistent subheaders with fallback RARs. The F flag, L field, and LCH Ind field are moved to the message body for success RARs.

TABLE 10

MAC Subheader Field Options

E: The Extension field is a flag indicating if the MAC subPDU including this MAC subheader is the last MAC subPDU or not in the MAC PDU; The size of the E field is 1 bit. For example, if the E field is set to "1" to indicate at least another MAC subPDU follows, while is set to "0" to indicate that the MAC subPDU including this MAC subheader is the last MAC subPDU in the MAC PDU.
T: The Type field is a flag indicating whether the MAC subheader contains a Random Access Preamble ID or a Backoff indicator. The T field is set to "0" to indicate the presence of backoff indicator in the subheader. The T field is set to "1" to indicate the presence of a Random Access Preamble ID field in the subheader (RAPID). If the T field indicates RAPID is included in the subheader, a MAC RAR is included in the MAC subPDU, and the MAC RAR can be either the success RAR or fallback RAR.
BI: The Backoff Indicator (BI) field identifies the overload condition in the cell. The size of the BI field is 4 bits.
RAPID: The RAPID filed identifies the transmitted Random Access preamble ID. The size of the RAPID filed is 6 bits.
R: Reserved bit, set to "0".

The bit values (and respective logical meanings) shown in table are examples. However, logical meanings may be assigned to other bit values.

TABLE 11

MAC Subheader Type Options

Figure 11:
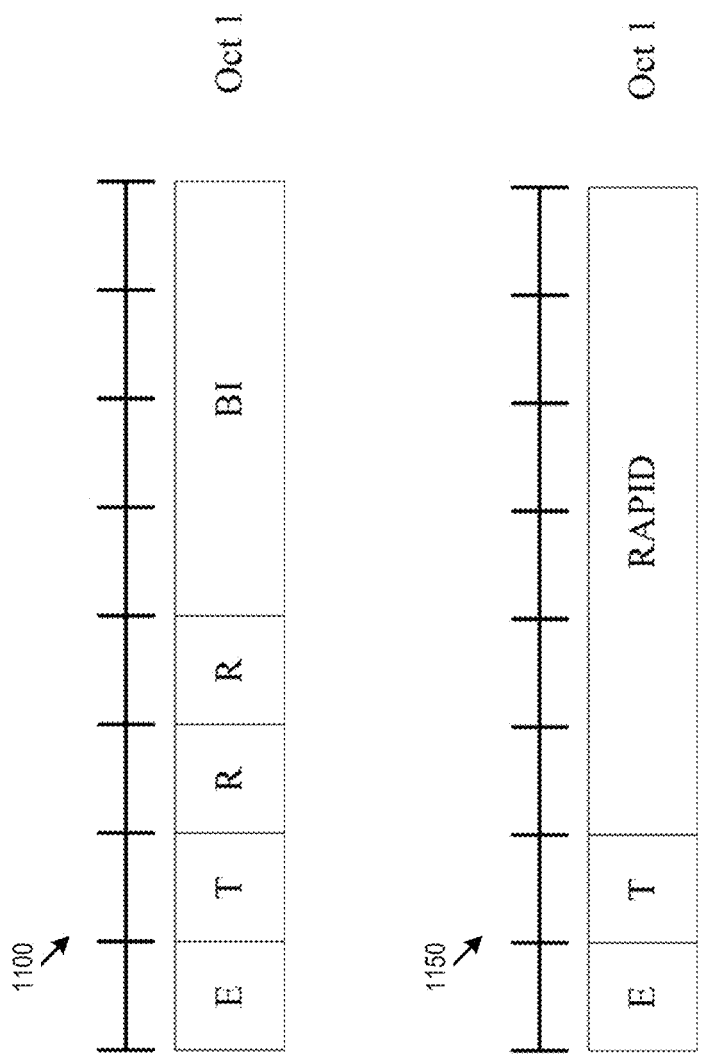
FIG. 11 shows example random access message subheaders.

Backoff Indicator only, which includes following header fields E/T/R/R/BI;
RAR (for both fallback RAR and success RAR), which includes three header fields: E/T/RAPID FIG. 11 shows an example one-octet BI subheader 1100 and an example one-octet RAR subheader 1150.

TABLE 12

Success RAR Body Format Field Options with SRB

T1: The RAR Type field is a flag to indicate the type of MAC RAR:
   "0": Fallback RAR
   "1": Success RAR.
   Or vice versa. If T1 indicates presence of success RAR, the F field is present.
F: The F field is a flag to indicate whether there is a SRB SDU in the success RAR:
   "0": There is no SRB SDU in the success RAR
   "1": There is SRB SDU in the success RAR. If the F is set to 1, the LCH Ind field and L field is present. And SRB SDU is included at the end of success RAR.

TABLE 12-continued

Success RAR Body Format Field Options with SRB

L: The length of SRB SDU. The size of the L field is 8 bits
   LCH Ind (Logical Channel Indicator): The LCH indicator is to indicate the
   logical channel ID of the SRB SDU. The size of LCH indicator can be of one
   or two bits.
     If the size of LCH indicator is of two bits, then:
       "0": The logical channel ID is 0.
       "1": The logical channel ID is 1.
   If the size of LCH indicator is of two bits, then:
       "00": The logical channel ID is 0.
       "01": The logical channel ID is 1.
       "10": The logical channel ID is 2.
       "11": The logical channel ID is 3.
   Or in another alternative for the LCH indicator that the LCH indicator can be
   used to indicate the SRB ID of the SRB SDU.
     If the size of LCH indicator is of 1 bit, then:
       "0": The SRB SDU is for SRB0
       "1": The SRB SDU is for SRB1.
   If the size of LCH indicator is of two bits, then:
       "00": The SRB SDU is for SRB0.
       "01": The SRB SDU is for SRB1.
       "10": The SRB SDU is for SRB2.
       "11": The SRB SDU is for SRB3.
Contention Resolution ID: The size of the Contention Resolution ID is 48 bits.
Timing Advance Command: The size of the Timing Advance Command field is 12
bits.
C-RNTI: The C-RNTI allocated for the UE within the cell. The size of the C-RNTI
field is 16 bits.
SRB: The size of the SRB field is indicated in the L filed in the corresponding
subheader.
R: Reserved bit, set to "0";

The bit values (and respective logical meanings) shown in table are examples. However, logical meanings may be assigned to other bit values.

Figure 12:
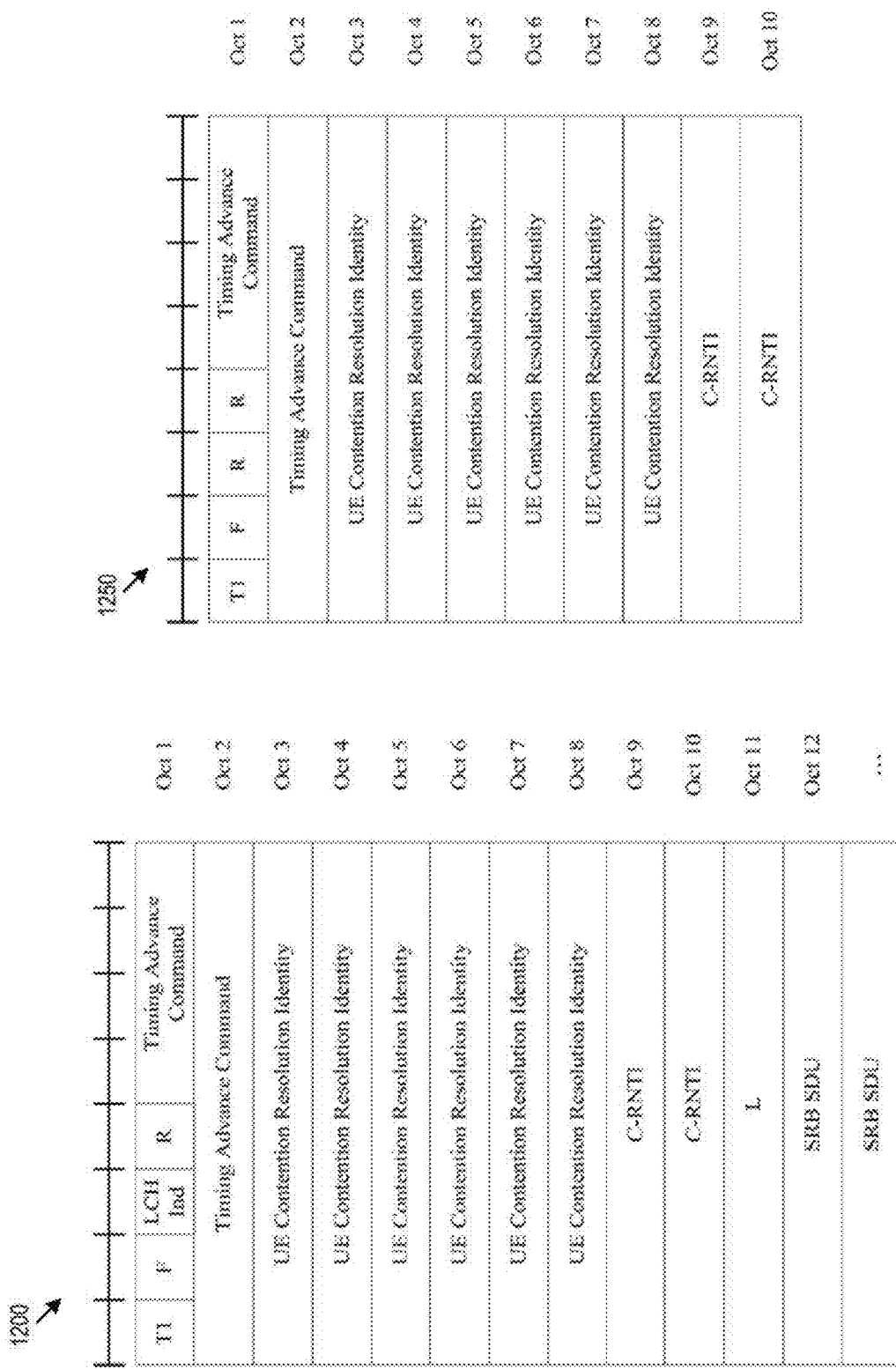
FIG. 12 shows example random access message bodies.

FIG. 12 shows an example multiple-octet success RAR body with SRB 1200 and an example multiple-octet success RAR body without SRB 1250.

Figure 13:
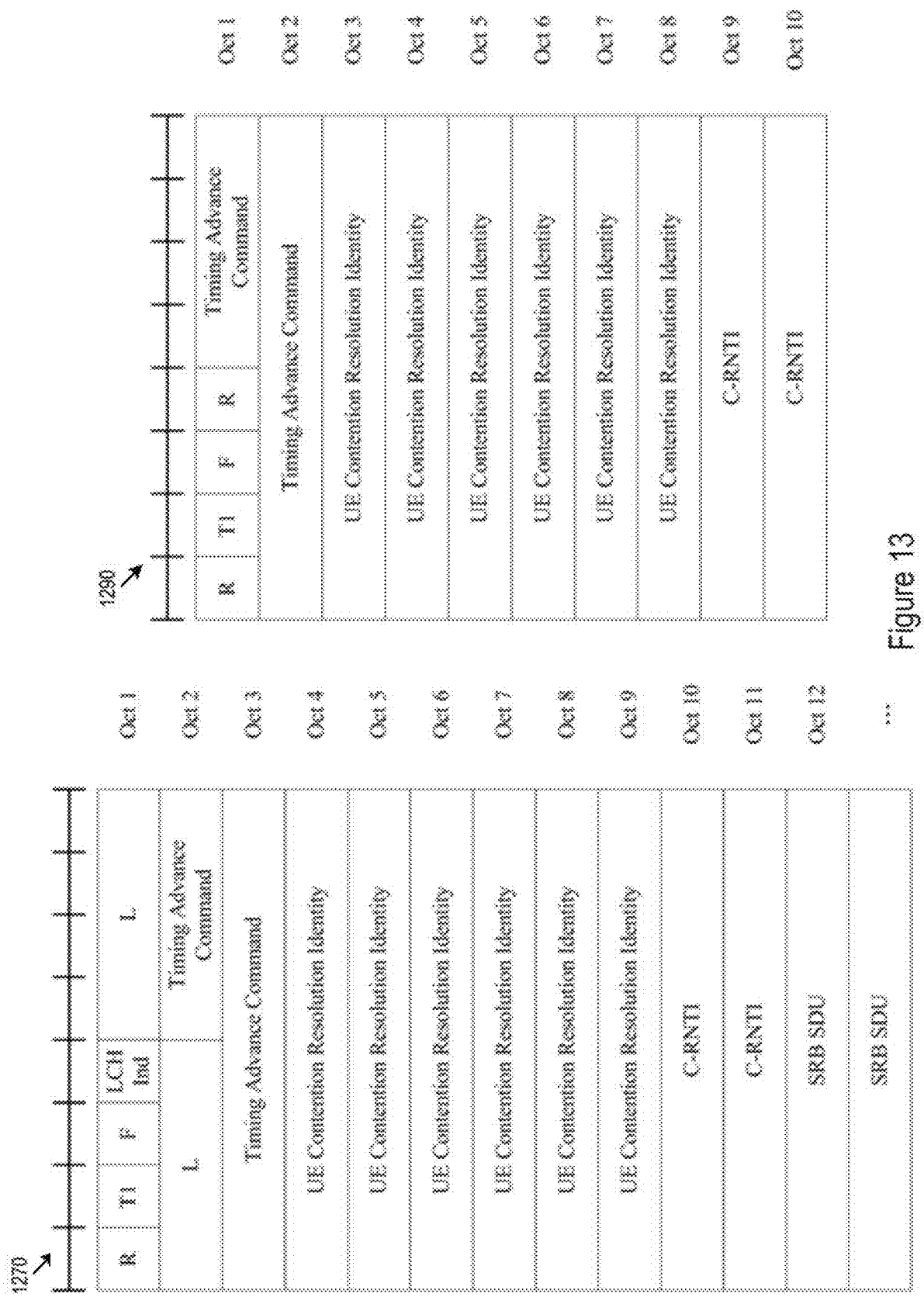
FIG. 13 shows example random access message subheaders.

Alternatively or additionally, the L field can be move to the front of the message body. Using the L field, the UE can identify the next MAC subPDU with the initial bits of the subPDU. FIG. 13 shows an example message body 1270 for a success RAR with SRB including an L field in the first and second octets and an example message body 1290 without SRB.

TABLE 13

Fallback RAR Body Format Field Options

T1: The RAR Type field is a flag to indicate the type of MAC RAR:
   "0": Fallback RAR
   "1": Success RAR. If T1 is set to 1, the F field is present.
Timing Advance Command: The size of the Timing Advance Command field is 12
bits.
UL (Uplink) Grant: The same as the UL Grant field used in various four-step RACH
implementations. The size of the UL Grant field is 27 bits;
Temporary C-RNTI: The Temporary C-RNTI field indicates the temporary identity
that is used by the MAC entity during Random Access. The size of the Temporary
C-RNTI field is 16 bits.

In some cases of example implementation 3, the Msg2 MAC PDU includes of one or more MAC subPDUs and optional padding. The MAC subPDU may include any or all of the following:

a MAC subheader with Backoff Indicator only;
   a MAC subheader and MAC RAR. The RAR can either be the success RAR or fallback RAR. Furthermore, the success RAR can be either with SRB SDU or without SRB SDU.

Example Implementation 4

In this example implementation, the type field in the BI subheader is replaced with a 1-bit backoff status indicator (BI Ind). The BI Ind field indicates whether the BI field should be ignored. In some cases, if BI Ind set to "0" can interpreted as the BI indicator included is invalid and UE set the backoff time as 0 ms. In some cases, Example Implementation 4 may be used where a BI subPDU is included in every Random Access Response, e.g. Msg2 of 2-step RACH. In some cases, the BI subheader is may form a first subPDU of each Msg2 sent by the base station. Each of the other subheaders may include a T field and RAPID field. The T field in the subheader may differentiate between fallback RARs and success RARs.

TABLE 14

Success RAR Body Format Field Options

F: The F field is a flag to indicate whether there is an SRB SDU in the success RAR:
    "0": There is no SRB SDU in the success RAR
    "1": There is SRB SDU in the success RAR.
  If the F indicates SRB SDU is included, the LCH Ind field and L field is
  present. And SRB SDU is included in payload of success RAR.
L: The length of SRB SDU. The size of the L field is 8 bits. Present when F field
indicates SRB SDU is included.
LCH Ind (Logical Channel Indicator): The LCH indicator is to indicate the logical
channel ID of the SRB SDU. The size of LCH indicator can be of one or two bits.
  If the size of LCH indicator is of two bits, then:
    "0": The logical channel ID is 0.
    "1": The logical channel ID is 1.
  If the size of LCH indicator is of two bits, then:
    "00": The logical channel ID is 0.
    "01": The logical channel ID is 1.
    "10": The logical channel ID is 2.
    "11": The logical channel ID is 3.
Or in another alternative for the LCH indicator that the LCH indicator can be used to
indicate the SRB ID of the SRB SDU.
  If the size of LCH indicator is of 1 bit, then:
    "0": The SRB SDU is for SRB0
    "1": The SRB SDU is for SRB1.
  If the size of LCH indicator is of two bits, then:
    "00": The SRB SDU is for SRB0.
    "01": The SRB SDU is for SRB1.
    "10": The SRB SDU is for SRB2.
    "11": The SRB SDU is for SRB3.
LCH Ind presents when F field indicates SRB SDU is included.
Contention Resolution ID: The size of the Contention Resolution ID is 48 bits.
Timing Advance Command: The size of the Timing Advance Command field is 12
bits.
C-RNTI: The C-RNTI allocated for the UE within the cell. The size of the C-RNTI
field is 16 bits.
SRB: The size of the SRB field is indicated in the L filed in the corresponding
subheader. Present when F field indicates SRB SDU is included.
R: Reserved bit, set to "0";

The bit values (and respective logical meanings) shown in table are examples. However, logical meanings may be assigned to other bit values.

Figure 14:
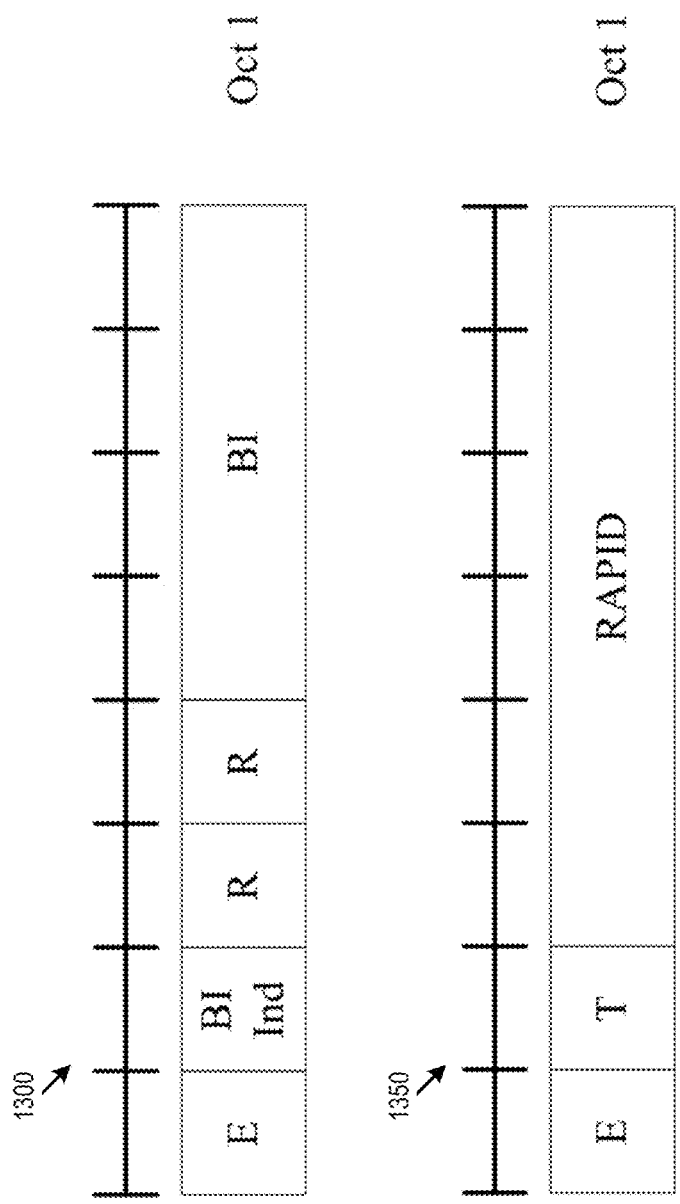
FIG. 14 shows an example one-octet BI subheader and an example one-octet RAR subheader.
Figure 15:
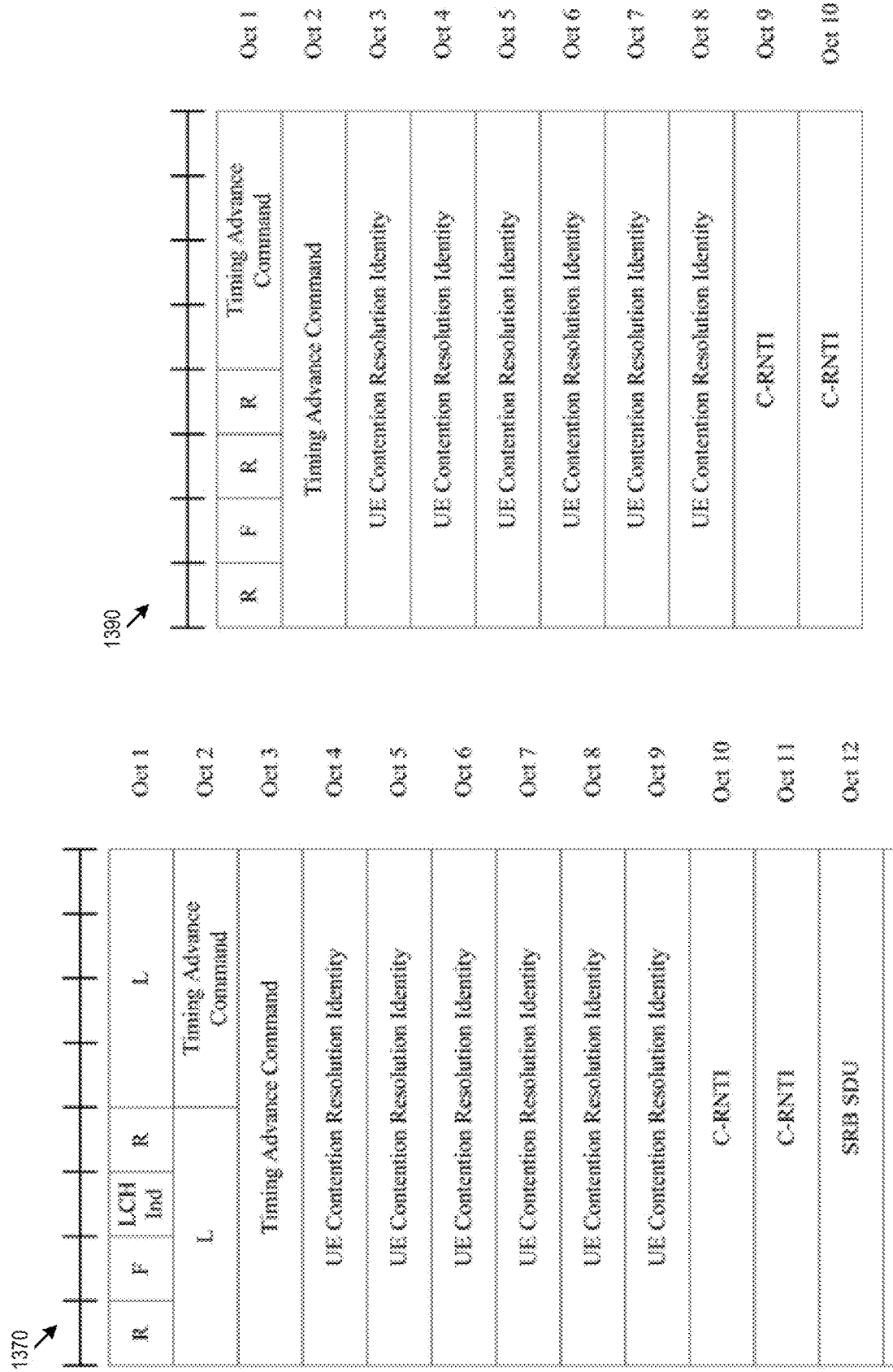
FIG. 15 shows an example message body for a success RAR with SRB and an example message body without SRB.

FIG. 14 shows an example one-octet BI subheader 1300 and an example one-octet RAR subheader 1350. FIG. 15 shows an example message body 1370 for a success RAR with SRB and an example message body 1390 without SRB.

In some cases of example implementation 4, the Msg2 MAC PDU includes one or more MAC subPDUs and optional padding. The MAC subPDUs may include any or all of the following:
    a MAC subheader with Backoff Indicator only;
    a MAC subheader and MAC RAR. The RAR can either be the success RAR or fallback RAR. Furthermore, the success RAR can be either with SRB SDU or without SRB SDU.

Example Implementation 5

In Example Implementation 5, the success RAR is combined with the SRB message like Example Implementation 2. Relative to Example Implementation 2, the type 2 field is shortened to one bit to distinguish between a BI subheader and a success RAR subheader. A F flag is included in the success RAR body to indicate whether an SRB field is present. Neither the RAPID field nor the UE CRID field is included in the success RAR subheader, the relevant field is included in the success RAR body.

TABLE 15

| MAC Subheader Field Options |
| --- |
| E: The Extension field is a flag indicating if the MAC subPDU including this MAC subheader is the last MAC subPDU or not in the MAC PDU; The size of the E field is 1 bit. For example, if the E field is set to "1" to indicate at least another MAC subPDU follows, while is set to "0" to indicate that the MAC subPDU including this MAC subheader is the last MAC subPDU in the MAC PDU.<br>T1: The Type 1 field is a flag indicating whether the MAC subheader contains a Random Access Preamble ID (RAPID, e.g., a preamble index), or a Type 2 field. The size of the T1 field is 1 bit. For example, the T1 field is set to "1" to indicate the presence of a RAPID, while set to "0" to indicate the presence of a T field.<br>T2: The Type 2 field is a flag to indicate the content of MAC subheader and the content of MAC subPDU after the MAC subheader. The definition of Type 2 field is given as follows:<br>    "0": Backoff Indicator is present in the MAC subheader, and the MAC subPDU include MAC subheader only.<br>    "1": A success RAR is included in the MAC subPDU. The success RAR can be either with or without SRB SDU.<br>BI: The Backoff Indicator (BI) field identifies the overload condition in the cell. The size of the BI field is 4 bits.<br>RAPID: The RAPID filed identifies the transmitted Random Access preamble ID. The size of the RAPID filed is 6 bits.<br>R: Reserved bit, set to "0". |

The bit values (and respective logical meanings) shown in table are examples. However, logical meanings may be assigned to other bit values.

Figure 16:
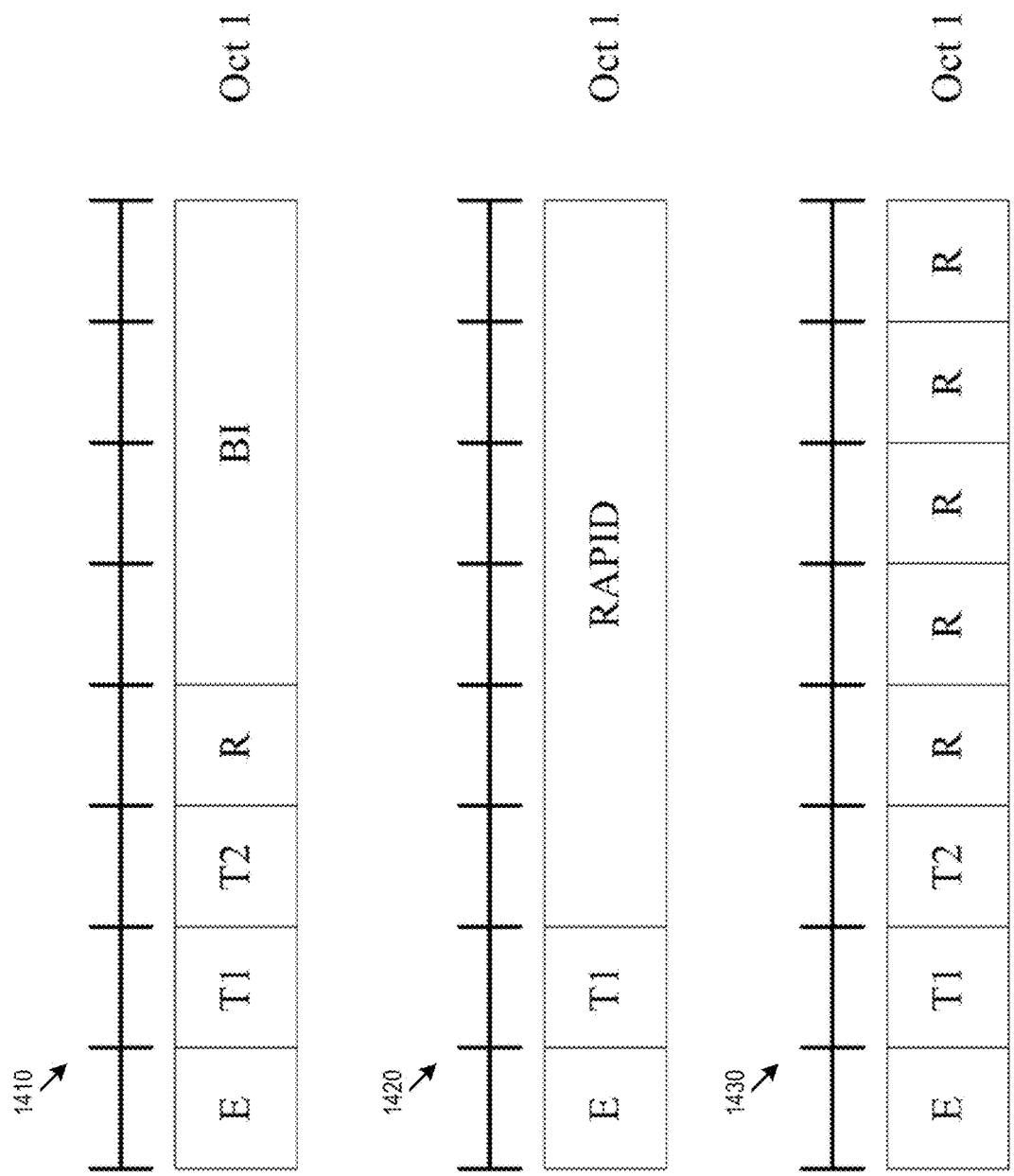
FIG. 16 shows an example one-octet BI subheader, an example one-octet fallback RAR subheader, and an example one-octet success RAR subheader.

FIG. 16 shows an example one-octet BI subheader 1410, an example one-octet fallback RAR subheader 1420, and an example one-octet success RAR subheader 1430.

In some cases of example implementation 5, the Msg2 MAC PDU includes one or more MAC subPDUs and optional padding. The MAC subPDUs include any or all of the following:
- a MAC subheader with Backoff Indicator only;
- a MAC subheader with RAPID and a fallback RAR;
- a MAC subheader and a success RAR, the success RAR can be either with or without SRB SDU.

Example Implementation 6

In Example Implementation 6, MAC subheaders may include two octets.

The MAC subheaders for Msg2 consists the same type of header fields as in example implementation 2, except the L field and LCH Ind field is moved to the payload part of RAR.

TABLE 16

| MAC Subheader Type Options |
| --- |
| Backoff Indicator only, which consists of following header fields E/T1/T2/BI/R/R/R/R/R/R/R |
| fallback RAR, which consists of following header fields E/T1/RAPID/R/R/R/R/R/R/R |
| Subheader with RAPID for RAR, which consists of following header fields: E/T1/T2/R/R/R/R/R/R/RAPID. |

Figure 17:
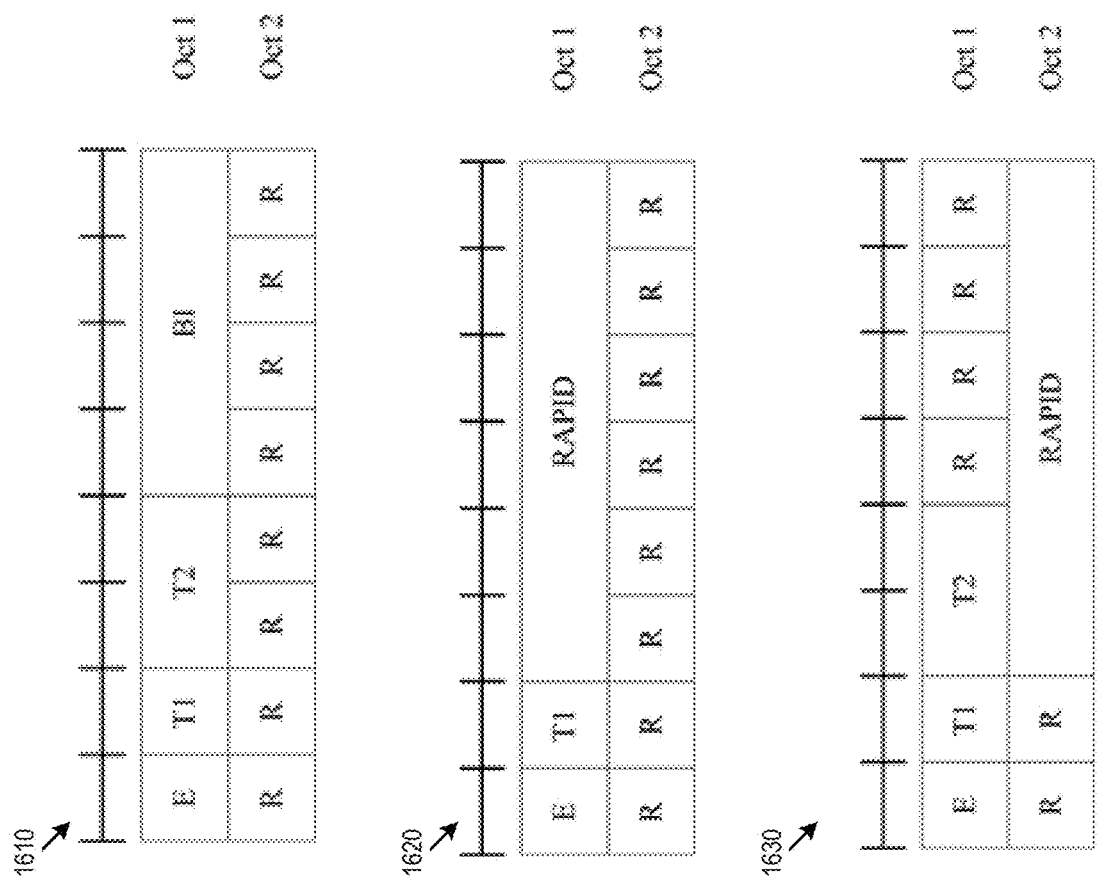
FIG. 17 shows an example two-octet BI subheader, an example two-octet fallback RAR subheader, and an example two-octet success RAR subheader.

FIG. 17 shows an example two-octet BI subheader 1710, an example two-octet fallback RAR subheader 1720, and an example two-octet success RAR subheader 1730.

TABLE 17

Success RAR Body Format Field Options with SRB

L: The length of SRB SDU. The size of the L field is 8 bits
  LCH Ind (Logical Channel Indicator): The LCH indicator is to indicate the
  logical channel ID of the SRB SDU. The size of LCH indicator can be of one
  or two bits.
  If the size of LCH indicator is of two bits, then:
    "0": The logical channel ID is 0.
    "1": The logical channel ID is 1.
  If the size of LCH indicator is of two bits, then:
    "00": The logical channel ID is 0.
    "01": The logical channel ID is 1.
    "10": The logical channel ID is 2.
    "11": The logical channel ID is 3.
  Or in another alternative for the LCH indicator that the LCH indicator can be
  used to indicate the SRB ID of the SRB SDU.
  If the size of LCH indicator is of 1 bits, then:
    "0": The SRB SDU is for SRB0
    "1": The SRB SDU is for SRB1.
  If the size of LCH indicator is of two bits, then:
    "00": The SRB SDU is for SRB0.
    "01": The SRB SDU is for SRB1.
    "10": The SRB SDU is for SRB2.
    "11": The SRB SDU is for SRB3.
Contention Resolution ID: The size of the Contention Resolution ID is 48 bits.
Timing Advance Command: The size of the Timing Advance Command field is 12
bits.
C-RNTI: The C-RNTI allocated for the UE within the cell. The size of the C-RNTI
field is 16 bits.
SRB: The size of the SRB field is indicated in the L field in the corresponding
subheader. The L field, LCH Ind field and SRB SDU field are present when the T2
field in the subheader indicates the SRB SDU is included in the success RAR.
R: Reserved bit, set to "0";

The bit values (and respective logical meanings) shown in table are examples. However, logical meanings may be assigned to other bit values.

Figure 18:
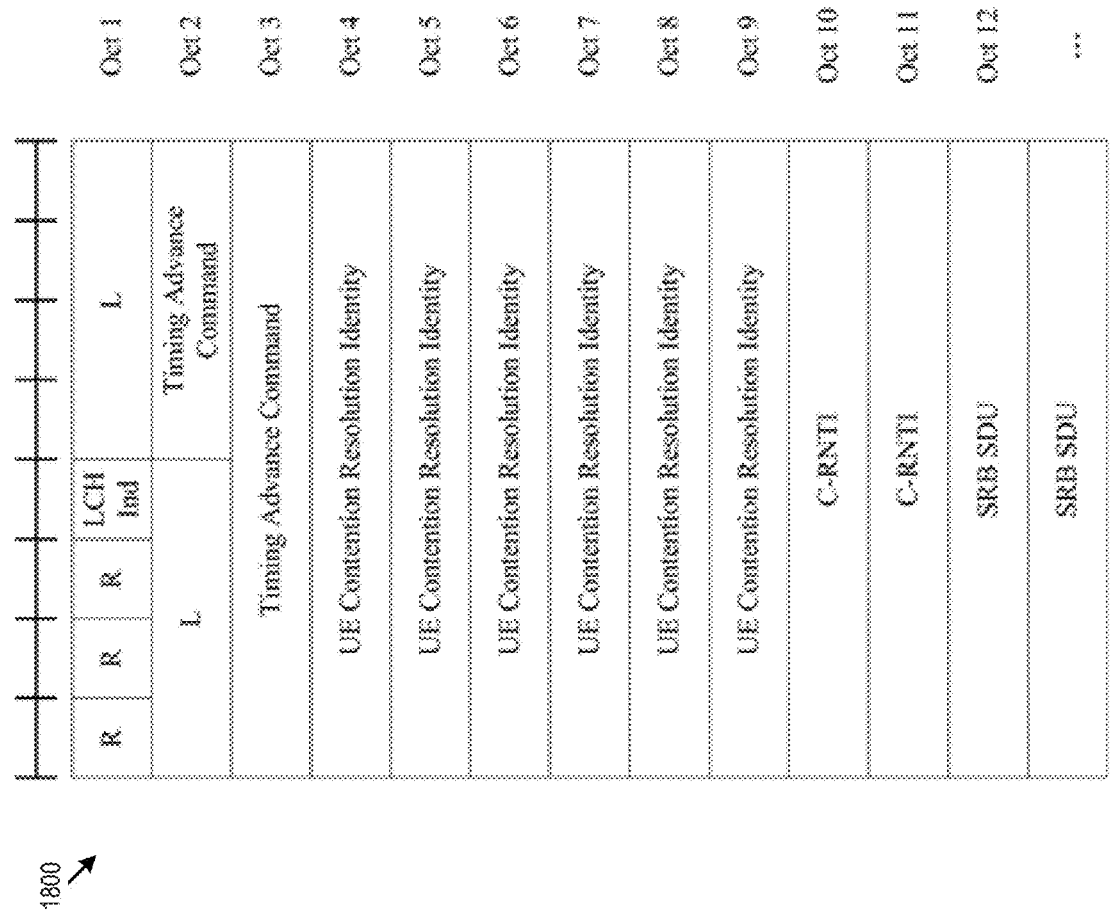
FIG. 18 shows an example success RAR message body with SRB.

FIG. 18 shows an example success RAR message body 1800 with SRB. For the format of the message body without SRB, refer to FIG. 7 item 700.

In some cases of example implementation 6, the Msg2 MAC PDU includes one or more MAC subPDUs and optional padding. The MAC subPDUs may include any or all of the following:

a MAC subheader with Backoff Indicator only;
a MAC subheader with RAPID and a fallback RAR;
a MAC subheader and a success RAR, the success RAR can be either with or without SRB SDU.

Example Implementation 7

In Example Implementation 7, the MAC subheader with BI indicator has a fixed size of 1 byte, while other of MAC subheaders include two octets. In some cases, the BI subheader serves as the first subPDU of each MAC PDU.

TABLE 18

MAC Subheader Field Options

E: The Extension field is a flag indicating if the MAC subPDU including this MAC
subheader is the last MAC subPDU or not in the MAC PDU; The size of the E field
is 1 bit. For example, if the E field is set to "1" to indicate at least another MAC
subPDU follows, while is set to "0" to indicate that the MAC subPDU including this
MAC subheader is the last MAC subPDU in the MAC PDU.
BI Ind: BI Indication is always in the MAC subheader for each BI, which is used to
indicate whether the BI indicator included in the subheader is valid or not. For
example:
    "0": The BI indicator included in the subheader is invalid, UE ignores the BI
    included in the subheader. In one example, if BI Ind set to "0" can
    interpreted as the BI indicator included is invalid and UE set the backoff time
    as 0 ms.
    "1": The BI indicator included in the subheader is valid, and UE uses the it
    to derive the backoff value to be applied.
T: The Type field is a flag indicating the type of MAC RAR in the MAC subPDU:
    "0": Fallback RAR
    "1": Success RAR. If T indicates presence of success RAR, the F field is
  present.
  F: The F field is a flag to indicate whether there is a SRB SDU in the success
  RAR:
    "0": There is no SRB SDU in the success RAR
    "1": There is SRB SDU in the success RAR. If the F indicates presence of SRB
    SDU, the LCH Ind field is present in the header. And L field and SRB SDU is
    included in the payload of success RAR.
L: The length of SRB SDU. The size of the L field is 8 bits TABLE 18-continued MAC Subheader Field Options LCH Ind (Logical Channel Indicator): The LCH indicator is to indicate the
logical channel ID of the SRB SDU. The size of LCH indicator can be of one
or two bits.
   If the size of LCH indicator is of two bits, then:
      "0": The logical channel ID is 0.
      "1": The logical channel ID is 1.
If the size of LCH indicator is of two bits, then:
      "00": The logical channel ID is 0.
      "01": The logical channel ID is 1.
      "10": The logical channel ID is 2.
      "11": The logical channel ID is 3.
Or in another alternative for the LCH indicator that the LCH indicator can be
used to indicate the SRB ID of the SRB SDU.
   If the size of LCH indicator is of 1 bits, then:
      "0": The SRB SDU is for SRB0
      "1": The SRB SDU is for SRB1.
If the size of LCH indicator is of two bits, then:
      "00": The SRB SDU is for SRB0.
      "01": The SRB SDU is for SRB1.
      "10": The SRB SDU is for SRB2.
      "11": The SRB SDU is for SRB3.
BI: The Backoff Indicator (BI) field identifies the overload condition in the cell. The
size of the BI field is 4 bits.
RAPID: The RAPID filed identifies the transmitted Random Access preamble. The
size of the RAPID filed is 6 bits.
R: Reserved bit, set to "0".

The bit values (and respective logical meanings) shown in table are examples. However, logical meanings may be assigned to other bit values.

Figure 19:
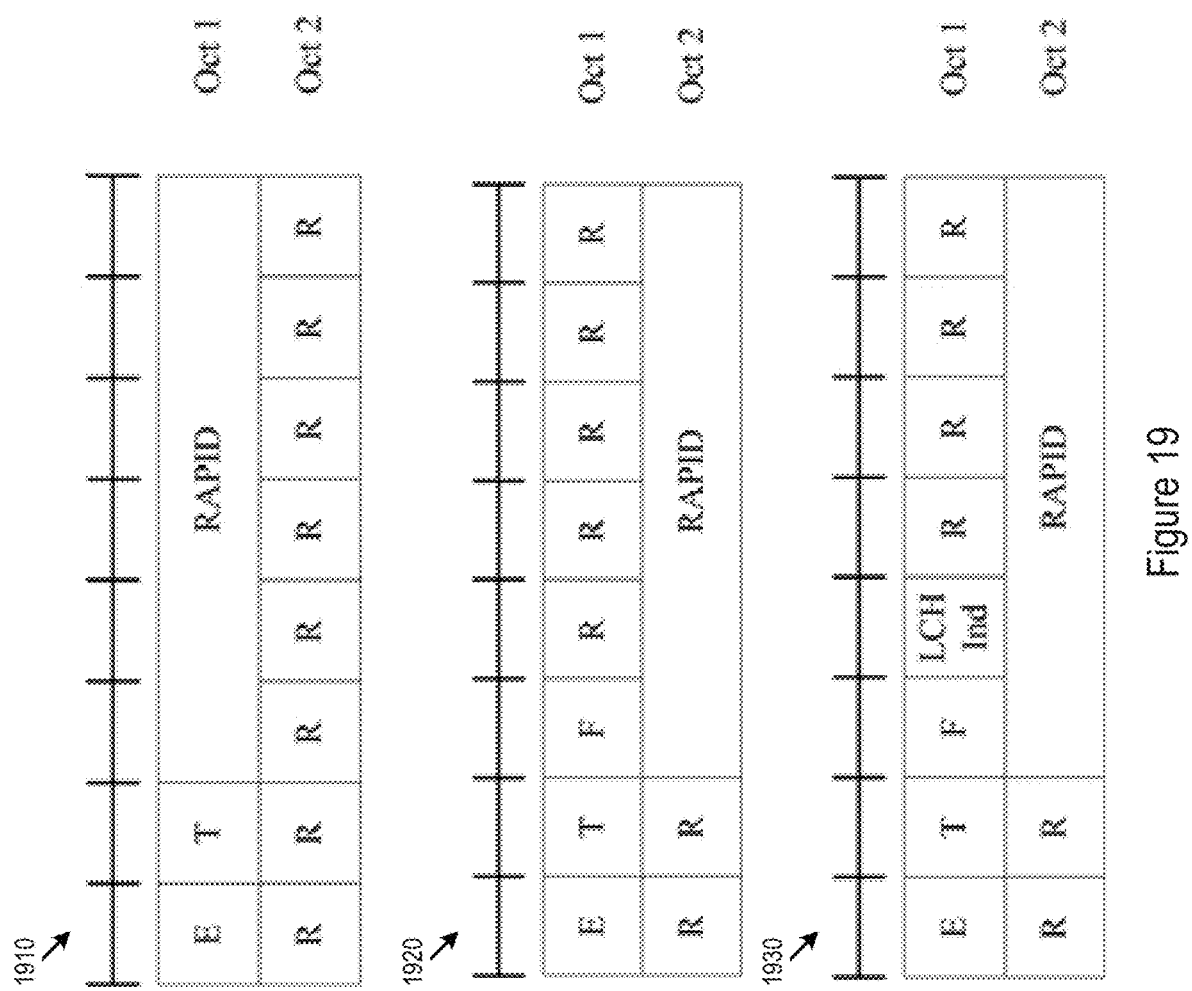
FIG. 19 shows an example two-octet fallback RAR subheader, an example two-octet success RAR without SRB SDU subheader, and an example two-octet success RAR with SRB SDU subheader.

FIG. 19 shows an example two-octet fallback RAR subheader 1910, an example two-octet success RAR without SRB SDU subheader 1920, and an example two-octet success RAR with SRB SDU subheader 1930. An example of a subheader with BI indicator is given in item 1300 of FIG. 14.

Figure 20:
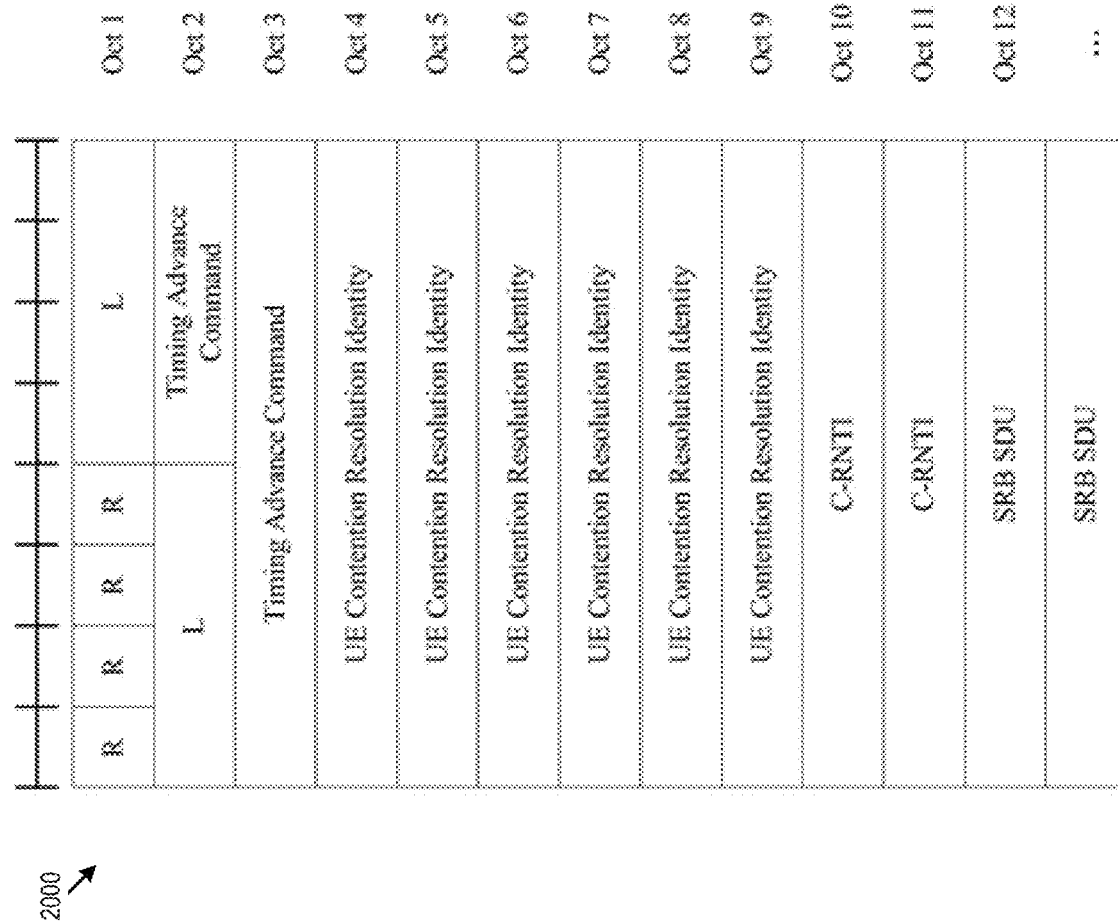
FIG. 20 shows an example success RAR message body 2000 with SRB.

FIG. 20 shows an example success RAR message body 2000 with SRB. For the format of the success RAR message body without SRB, refer to FIG. 7 item 700. For the format of the fallback RAR message body, refer to FIG. 8 item 850.

In some cases of Example Implementation 7, the Msg2 MAC PDU consists of one or more MAC subPDUs and optional padding. The MAC subPDUs may include any or all of the following:

a MAC subheader with Backoff Indicator only;
   a MAC subheader and a fallback RAR;
   a MAC subheader and a success RAR with SRB SDU
   a MAC subheader and a success RAR without SRB SDU Example Implementation 8

In Example Implementations 1-7, the presence (or absence) of the SRB may indicated to UE by a one-bit indicator included in at least one of the following message:
   Broadcast information
   System information
   RRC signaling
   or other information provided to UEs, e.g. physical layer signaling information.

Accordingly, F flags may be omitted (or ignored) and two-bit T fields may be shortened to one-bit. In some cases, a two-bit T field may be reinterpreted to distinguish two options and reserve bit values:

TABLE 18

Reinterpretation of example two-bit T field

T: The Type field is a flag to indicate the content of MAC subheader and the content
of MAC subPDU after the MAC subheader. The size of T is 2 bits. The definition of
Type field can be given as follows:
    "00": Backoff Indicator is present in the MAC subheader, and the MAC
   subPDU include MAC subheader only.
    "01": RAPID field (Or in another alternative Contention Resolution ID) is
   present in the MAC subheader, and a success RAR is included in the MAC
   subPDU.
    "10": Reserved.
    "11": Reserved.

The bit values (and respective logical meanings) shown in table are examples. However, logical meanings may be assigned to other bit values.

In Example Implementations 1-8, an UL grant or/and a downlink (DL) assignment may be included in the content of the success RAR. For example, a UL grant can be included in a success RAR for the transmission of the acknowledgement. In another example, an UL grant may be included in a success RAR with an SRB field for subsequent uplink transmissions, e.g. an RRCSetupComplete transmission.

In another example, a DL assignment may be included in a success RAR without an SRB for subsequent downlink transmissions, e.g. an RRCSetup transmission.

In Example Implementations 1-8, information for UL ACK transmission may be included in the content of success RAR.

In Example Implementation 1-8, the LCH Indicator can be alternatively used to indicate the SRB ID of the SRB SDU.

If the size of LCH Ind is of 1 bit, then:
"0": The SRB SDU is for SRB0
"1": The SRB SDU is for SRB1.
If the size of LCH Ind is of two bits, then:
"00": The SRB SDU is for SRB0.
"01": The SRB SDU is for SRB1.
"10": The SRB SDU is for SRB2.
"11": The SRB SDU is for SRB3.

In Example Implementations 1-8, the positions of fields within subheaders and message bodies may be moved within and among octets. For example, a field at the beginning of an octet may be moved to the end of the octet. For example, a field in the example messages in a given octet may be split among multiple octets or moved to another octet. In some cases, fields in subheaders may be ordered such that when given fields indicate the presence (or absence) of other fields, the given fields are decoded (e.g., by the UE) first.

Various implementations have been specifically described. However, many other implementations are also possible.

What is claimed is:

1. A method for performing random access by a base station, comprising:
   receiving a first message from a user equipment (UE) in a random access procedure;
   generating a second message including a random access message, the second message being responsive to the first message, the random access message including:
   a first media access control (MAC) sub-protocol data unit (subPDU), having a first subheader and a success random access response (RAR), wherein the first subheader includes a type 1 field configured to indicate a type 2 field is present within the random access message, the type 2 field being set to "1" to indicate the success RAR is included in the first MAC subPDU; and
   transmitting the second message to the UE.

2. The method of claim 1, wherein a size of the type 1 field is 1 bit.

3. The method of claim 2, wherein the type 1 field is either set to "1" to indicate presence of a Random Access Preamble ID (RAPID) or is set to "0" to indicate presence of the type 2 field.

4. The method of claim 1, wherein a size of the type 2 field is 1 bit.

5. The method of claim 1, wherein the random access message further comprises a format flag indicating whether the random access message includes a signal radio bearer parameter.

6. The method of claim 1, wherein the random access message further includes a second MAC subPDU located after the success RAR, wherein the second MAC subPDU includes a second subheader and a MAC Service Data Unit (SDU).

7. A method for performing random access by a user equipment (UE), comprising:
   sending a first message to a base station in a random access procedure; and
   receiving a second message including a random access message from the base station, the second message being responsive to the first message, the random access message including:
   a first media access control (MAC) sub-protocol data unit (subPDU), having a first subheader and a success random access response (RAR), wherein the first subheader includes a type 1 field configured to indicate a type 2 field is present within the random access message, the type 2 field being set to "1" to indicate the success RAR is included in the first MAC subPDU.

8. The method of claim 7, wherein a size of the type 1 field is 1 bit.

9. The method of claim 8, wherein the type 1 field is either set to "1" to indicate presence of a Random Access Preamble ID (RAPID) or is set to "0" to indicate presence of the type 2 field.

10. The method of claim 7, wherein a size of the type 2 field is 1 bit.

11. The method of claim 7, wherein the random access message further comprises a format flag indicating whether the random access message includes a signal radio bearer parameter.

12. The method of claim 7, wherein the random access message further includes a second MAC subPDU located after the success RAR, wherein the second MAC subPDU includes a second subheader and a MAC Service Data Unit (SDU).

13. The method of claim 7, further comprising decoding the type 2 field when the type 1 field indicates that the type 2 field is present.

14. The method of claim 7, further comprising decoding a preamble index corresponding to a random access preamble included in the first message when the type 1 field indicates that the type 2 field is not present.

15. A wireless communication apparatus, comprising:
   at least one memory, storing one or more instructions; and
   at least one processor, configured to execute the one or more instructions to perform steps, comprising:
   receiving a first message from a user equipment (UE) in a random access procedure;
   generating a second message including a random access message, the second message being responsive to the first message, the random access message including:
   a first media access control (MAC) sub-protocol data unit (subPDU), having a first subheader and a success random access response (RAR), wherein the first subheader includes a type 1 field configured to indicate a type 2 field is present within the random access message, the type 2 field being set to "1" to indicate the success RAR is included in the first MAC subPDU; and
   transmitting the second message to the UE.

16. The wireless communication apparatus of claim 15, wherein:

a size of the type 1 field is 1 bit; and
the type 1 field is either set to "1" to indicate presence of a Random Access Preamble ID (RAPID) or is set to "0" to indicate presence of the type 2 field; and
a size of the type 2 field is 1 bit.

17. The wireless communication apparatus of claim 15, wherein the random access message further comprises a format flag indicating whether the random access message includes a signal radio bearer parameter.

18. The wireless communication apparatus of claim 15, wherein the random access message further includes a second MAC subPDU located after the success RAR, wherein the second MAC subPDU includes a second subheader and a MAC Service Data Unit (SDU).

19. A wireless communication apparatus, comprising:
at least one memory, storing one or more instructions; and
at least one processor, configured to execute the one or more instructions to perform steps, comprising:
sending a first message to a base station in a random access procedure; and
receiving a second message including a random access message from the base station, the second message being responsive to the first message, the random access message including:
a first media access control (MAC) sub-protocol data unit (subPDU), having a first subheader and a success random access response (RAR), wherein the first subheader includes a type 1 field configured to indicate a type 2 field is present within the random access message, the type 2 field being set to "1" to indicate the success RAR is included in the first MAC subPDU.

20. The wireless communication apparatus of claim 19, wherein:
a size of the type 1 field is 1 bit;
the type 1 field is either set to "1" to indicate presence of a Random Access Preamble ID (RAPID) or is set to "0" to indicate presence of the type 2 field; and
a size of the type 2 field is 1 bit.

21. The wireless communication apparatus of claim 19, wherein the random access message further comprises a format flag indicating whether the random access message includes a signal radio bearer parameter.

22. The wireless communication apparatus of claim 19, wherein the random access message further includes a second MAC subPDU located after the success RAR, wherein the second MAC subPDU includes a second subheader and a MAC Service Data Unit (SDU).

23. The wireless communication apparatus of claim 19, wherein the at least one processor is further configured to execute the one or more instructions to perform steps, comprising:
decoding the type 2 field when the type 1 field indicates that the type 2 field is present; and
decoding a preamble index corresponding to a random access preamble included in the first message when the type 1 field indicates that the type 2 field is not present.

\* \* \* \* \*